United States Patent
Wang et al.

(10) Patent No.: US 12,149,379 B2
(45) Date of Patent: Nov. 19, 2024

(54) IN-VEHICLE COMMUNICATIONS SYSTEM, IN-VEHICLE COMMUNICATION METHOD, AND DEVICE

(71) Applicant: HUAWEI TECHNOLOGIES CO., LTD., Guangdong (CN)

(72) Inventors: Xuehuan Wang, Chengdu (CN); Xingxin Zhang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/481,507

(22) Filed: Sep. 22, 2021

(65) Prior Publication Data

US 2022/0006669 A1   Jan. 6, 2022

Related U.S. Application Data

(63) Continuation of application No. PCT/CN2020/077848, filed on Mar. 4, 2020.

(30) Foreign Application Priority Data

May 13, 2019 (CN) .......................... 201910395575.0

(51) Int. Cl.
*H04L 12/46* (2006.01)
*H04L 12/427* (2006.01)
(Continued)

(52) U.S. Cl.
CPC ........ *H04L 12/4604* (2013.01); *H04L 12/427* (2013.01); *H04L 12/437* (2013.01);
(Continued)

(58) Field of Classification Search
CPC . H04L 12/4604; H04L 12/427; H04L 12/437; H04L 45/02; H04L 45/28; H04L 2012/40273; H04W 4/48
See application file for complete search history.

(56) References Cited

U.S. PATENT DOCUMENTS 6,538,991 B1 * 3/2003 Kodialam ............. H04L 47/829
370/395.42
6,801,502 B1 * 10/2004 Rexford .................. H04L 45/22
370/254
(Continued)

FOREIGN PATENT DOCUMENTS

CN   1960893 A   5/2007
CN   202615204 U   12/2012
(Continued)

OTHER PUBLICATIONS

Helge Zinner et al., "Automotive E/E Architecture evolution and the impact on the network", IEEE802 Plenary, Mar. 2019, 802.1 TSN, total 10 pages.

*Primary Examiner* — Luat Phung
(74) *Attorney, Agent, or Firm* — HUAWEI TECHNOLOGIES CO., LTD.

(57) ABSTRACT

This application provides an in-vehicle communications system used in a vehicle. The in-vehicle communications system includes a control device, a plurality of gateway devices, and a plurality of communication endpoints. Each gateway device is communicatively coupled to the control device, and each gateway device is communicatively coupled to at least two other gateway devices. Each gateway device is further communicatively coupled to at least one communication endpoint. A gateway device or a controller is configured to: when receiving communication data of end-to-end communication, route the communication data by using a first communication link indicated by a local routing policy, and if the first communication link is abnormal, route a part or all of the communication data by using a second communication link. The system may be used in the field of assisted driving and self-driving.

20 Claims, 10 Drawing Sheets

(51) Int. Cl.
*H04L 12/437* (2006.01)
*H04L 45/02* (2022.01)
*H04L 45/28* (2022.01)
*H04W 4/48* (2018.01)
*H04L 12/40* (2006.01)

(52) U.S. Cl.
CPC .............. *H04L 45/02* (2013.01); *H04L 45/28* (2013.01); *H04W 4/48* (2018.02); *H04L 2012/40273* (2013.01)

(56) References Cited

U.S. PATENT DOCUMENTS

| | | | |
|---|---|---|---|
| 7,999,408 B2 | 8/2011 | Fehr et al. | |
| 8,248,913 B1* | 8/2012 | Liu | H04L 45/22 |
| | | | 370/216 |
| 8,705,527 B1 | 4/2014 | Addepalli et al. | |
| 2004/0090955 A1* | 5/2004 | Berthaud | H04L 47/122 |
| | | | 370/386 |
| 2006/0180371 A1* | 8/2006 | Breed | B60R 21/01516 |
| | | | 180/197 |
| 2008/0130627 A1* | 6/2008 | Chen | H04L 45/3065 |
| | | | 370/351 |
| 2012/0218412 A1 | 8/2012 | Dellantoni et al. | |
| 2013/0201316 A1* | 8/2013 | Binder | H04L 67/12 |
| | | | 701/2 |
| 2014/0078889 A1* | 3/2014 | Diab | H04L 67/63 |
| | | | 370/221 |
| 2015/0183292 A1* | 7/2015 | Muralidhar | F25D 11/003 |
| | | | 62/133 |
| 2017/0111214 A1 | 4/2017 | Zourzouvillys | |
| 2019/0250610 A1* | 8/2019 | Luo | G05D 1/0246 |
| 2019/0258251 A1* | 8/2019 | Ditty | G06V 20/58 |
| 2019/0359127 A1* | 11/2019 | Alfano | B60Q 5/005 |
| 2021/0067927 A1* | 3/2021 | Mizukoshi | H04W 4/40 |
| 2021/0367808 A1* | 11/2021 | Zhan | H04L 12/40071 |

FOREIGN PATENT DOCUMENTS

| | | |
|---|---|---|
| CN | 103428031 A | 12/2013 |
| CN | 105700519 A | 6/2016 |
| CN | 105703993 A | 6/2016 |
| CN | 106506310 A | 3/2017 |
| CN | 108177612 A | 6/2018 |
| CN | 109474912 A | 3/2019 |
| JP | S63173746 A | 7/1988 |
| JP | 2007228232 A | 9/2007 |
| JP | 2008166990 A | 7/2008 |
| JP | 2009017230 A | 1/2009 |
| JP | 2009094731 A | 4/2009 |
| JP | 2010098467 A | 4/2010 |
| JP | 2016196295 A | 11/2016 |
| JP | 2016220055 A | 12/2016 |
| JP | 2017074887 A | 4/2017 |
| JP | 2019134301 A | 8/2019 |
| WO | 2019187203 A1 | 10/2019 |
| WO | 2020145334 A1 | 7/2020 |

* cited by examiner

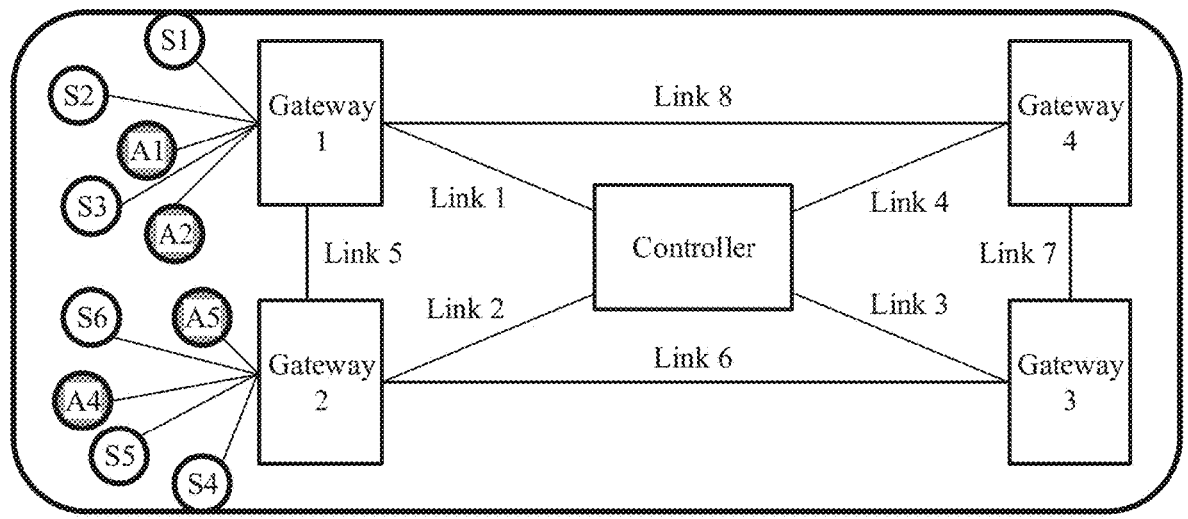
FIG. 3
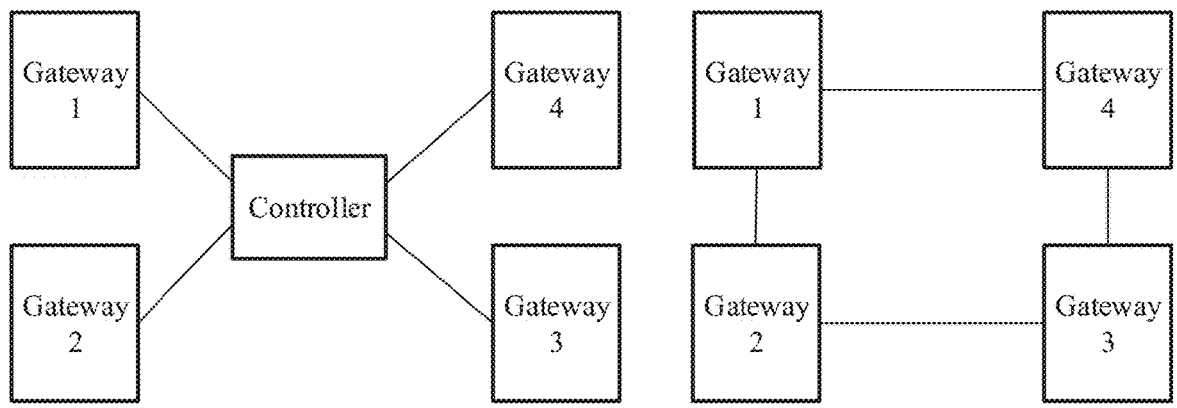
FIG. 4a Star network
FIG. 4b Ring network

Mesh network

IN-VEHICLE COMMUNICATIONS SYSTEM, IN-VEHICLE COMMUNICATION METHOD, AND DEVICE

CROSS-REFERENCE TO RELATED APPLICATIONS

This application is a continuation of International Application No. PCT/CN2020/077848, filed on Mar. 4, 2020, which claims priority to Chinese Patent Application No. 201910395575.0, filed on May 13, 2019. The disclosures of the aforementioned applications are hereby incorporated by reference in their entireties.

TECHNICAL FIELD

The present disclosure relates to the field of vehicle technologies, and in particular, to an in-vehicle communications system, an in-vehicle communication method, and a device.

BACKGROUND

An automobile electrical/electronic (electrical/electronic, E/E) architecture system implements interconnection and functions of components such as an electrical/electronic controller, a sensor, and an actuator in a vehicle. An E/E architecture includes all electrical/electronic components, an interconnection structure/a topology structure, and logical functions of the electrical/electronic components. An in-vehicle communications network is a framework of the E/E architecture, and connects all electric control units (Electric Control Unit, ECU) in the vehicle, to implement communication between the ECUs such as the controller, a memory, the actuator, and the sensor.

With development of science and technology, intelligent cars (intelligent car), especially self-driving cars (self-driving car), have become an important development direction of the global automobile industry. The self-driving cars can be used to transport people or goods. This can greatly improve people's travel convenience and efficiency. In the future, the self-driving cars will have high business value and social value. The self-driving car is a vehicle that can sense an environment around the self-driving car in navigation and implement self-driving when the vehicle is unmanned. Various vehicle-mounted devices in the car play a very important role in processes such as intelligent driving (intelligent driving), assisted driving, self-driving, and communication of the intelligent car. Various in-vehicle facilities such as switches, bridges, and the Ethernet installed on the car transmit various types of sensed and collected data or communication data at any time during traveling of the car. These facilities play an important role in the internet of vehicles, vehicle-to-vehicle communication, and vehicle-to-people communication, and effectively improve safety and comfort of automobile driving. Specifically, the self-driving car may detect information about a car position and a surrounding object by using devices such as an acoustic radar, a laser radar, a navigation system, an odometer, an accelerometer, and a camera, and may interpret the detected information and identify a navigation path by using a control system, to drive an actuator to complete self-driving.

A low-latency, robust, stable, and reliable in-vehicle communications network ensures safe traveling of the self-driving car. How to improve safety (security) of the self-driving car is one of problems to be urgently resolved by a person skilled in the art.

SUMMARY

Embodiments of the present disclosure provide an in-vehicle communications system of a vehicle, an in-vehicle communication method, and a device, to help implement a low-latency, robust, stable, and reliable in-vehicle communications network, and improve safety of a self-driving car.

According to a first aspect, the present disclosure provides an in-vehicle communications system. The system includes at least one control device (the control device in this specification may also be referred to as a controller for short), a plurality of gateway devices (the gateway devices in this specification may also be referred to as gateways for short), and a plurality of communication endpoints. Each gateway device is communicatively coupled to the control device, each gateway device is communicatively coupled to at least two other gateway devices in the plurality of gateway devices, each gateway device is further communicatively coupled to at least one communication endpoint, and the plurality of gateway devices include a first gateway device. The control device is configured to control each communication endpoint in the plurality of communication endpoints. The first gateway device is configured to: when receiving first communication data of end-to-end communication, route the first communication data by using a first communication link indicated by a local routing policy, and when the first communication link is abnormal, route a part or all of the first communication data by using a second communication link indicated by the local routing policy.

The end-to-end communication includes at least one of the following: communication between at least two communication endpoints in the plurality of communication endpoints, communication between at least two gateway devices in the plurality of gateway devices, communication between any communication endpoint in the plurality of communication endpoints and the control device, or communication between any gateway device in the plurality of gateway devices and the control device.

It can be learned that in an architecture of the in-vehicle communications network provided in the present disclosure, each gateway device is designed to be coupled to the control device, and each gateway device is communicatively coupled to at least two other gateway devices, so that communication line redundancy can be caused in terms of an architecture and a system design. In a normal case, the gateway device in the in-vehicle communications network may select the first communication link (for example, an optimal/shortest communication link) based on a network topology to implement communication, so that a communication requirement for low-latency transmission between the gateway and the controller and between the gateways can be ensured. In addition, when the first communication link is abnormal (for example, a gateway or an interface or a line in the first communication link is abnormal), a network transmission capability can still be provided based on the communication line redundancy. In other words, communication data is transmitted by using the second communication link. This ensures communication function security, improves robustness, stability, and reliability of the in-vehicle communications network, and improves safety of cars, especially self-driving cars.

According to the first aspect, in a possible embodiment, the control device may alternatively be coupled to at least one communication endpoint.

According to the first aspect, in a possible embodiment, each communication endpoint may be, for example, a sensor, or may be an electric control unit (Electric Control Unit, ECU) of an actuator.

The sensor is configured to collect environment-related data. The sensor may be, for example, a millimeter-wave radar, a laser radar, an ultrasonic radar, a camera, a positioning system (for example, a GPS or a beidou positioning system), an inertial sensor, a speed sensor, an acceleration sensor, a humidity sensor, or a light intensity sensor in a vehicle.

The ECU refers to an electronic unit that is inside the vehicle and that has computing and control functions, controls one or more functions, and sends information or a command to an actuator or another controlled component of the vehicle. The ECU may be, for example, an ECU of a servo motor, an ECU of a hydraulic device, or an ECU of a dedicated system. The dedicated system is, for example, an anti-lock braking system (Anti-lock Braking System, ABS) or an electronic stability program (Electronic Stability Program, ESP). Various ECUs may be referred to as actuators in this specification.

According to the first aspect, in a possible embodiment, each gateway device in the plurality of gateway devices is coupled in series to a gateway device adjacent to the gateway device, to form a ring communications network.

In the embodiment of the first aspect of the present disclosure, each gateway device is communicatively coupled to the control device, and each gateway device is coupled to the control device, to form a star communications network (a star network for short). Therefore, when the ring communications network (a ring network for short) is further formed between the plurality of gateway devices, the star network and the ring network jointly implement redundant transmission. A network topology architecture formed based on the star network and the ring network can provide redundancy in terms of an architecture and a system design. In a normal case, a device (for example, the gateway or the controller) in the in-vehicle communications network may select an optimal/shortest communication link based on the network topology to implement communication, so that a communication requirement for low-latency transmission between the gateway and the controller and between the gateways can be ensured. When a gateway, an interface, or a link is abnormal, redundancy transmission implemented by the star network and the ring network is used to ensure a network transmission capability, ensure communication function security, further improve robustness, stability, and reliability of the in-vehicle communications network, and further improve safety of cars, especially self-driving cars.

According to the first aspect, in a possible embodiment, each gateway device in the plurality of gateway devices is communicatively coupled to all other gateway devices, to form a mesh communications network (a mesh network).

According to the first aspect, in a possible embodiment, the local routing policy of the first gateway device is determined based on a network topology of the in-vehicle communications system and a route target of the end-to-end communication.

In the embodiment of the first aspect of the present disclosure, each gateway device is coupled to the control device, to form the star network. Therefore, when the plurality of gateway devices further form the mesh network, the star network and the ring network jointly implement redundant transmission. Compared with the foregoing ring network, the mesh network can further enhance a redundant connection between the gateways. Therefore, the network topology architecture formed based on the star network and the mesh network can provide more/more complex redundancy in terms of an architecture and a system design. In a normal case, a device (for example, the gateway or the controller) in the in-vehicle communications network may select an optimal/shortest communication link based on the network topology to implement communication, so that a communication requirement for low-latency transmission between the gateway and the controller and between the gateways can be ensured. When a gateway, an interface, or a link is abnormal, redundancy transmission implemented by the star network and the mesh network is used to ensure a network transmission capability, ensure communication function security, further improve robustness, stability, and reliability of the in-vehicle communications network, and further improve safety of cars, especially self-driving cars.

According to the first aspect, in a possible embodiment, that the first communication link is abnormal specifically includes at least one of the following:

the first communication link fails, the first communication link is congested, or some functions of the first communication link fail.

That the first communication link fails may be that a related network element in the first communication link is abnormal (for example, a failure or a fault). For example, the entire gateway may be faulty, one or more sensors/actuators may be faulty, or even a chip of the controller may be abnormal.

Alternatively, that the first communication link fails may be that a connection line, a cable, or an interface in the first communication link is abnormal (for example, a failure, a fault, or a disconnection). For example, a connection between the sensor/actuator and the gateway, a connection between the sensor/actuator and the controller, a connection between the gateway and the gateway, or a connection between the gateway and the controller may be abnormal.

That some functions of the first communication link fail may be that a switching capability of the gateway decreases because some functions of a gateway in the first communication link fail, or a traffic capability of a line port decreases, or a switching capability of the gateway decreases; or may be a problem of the controller in the first communication link, for example, a problem of a physical chip between the controller and a gateway causes a decrease in a transmission rate.

That the link fails or some functions fail may be caused by various reasons, for example, a device/a line/an interface is aged, line congestion may be caused by a complex communication scenario, and loosening/falling/damage/disconnection of an electronic component may be caused by collision/bump during running of the vehicle.

That the first communication link is congested may be that communication traffic in a gateway, a connection line, a cable, or an interface involved in the first communication link exceeds a normally processed traffic threshold, and consequently, communication bandwidth is occupied.

That the link is congested may be caused because communication data is largely increased in an emergency state, or traffic is distributed to the link due to an exception of another communication link.

It can be learned that, theoretically, electronic components such as the chip of the controller, the cable, the interface, and a connector may fail randomly, or various electronic components may be loose, disconnected, or damaged during bumping, or some electronic components may be faulty or damaged after a car collision, or the link may be congested because an amount of data of a link is increased. These possibilities may cause interruption of in-vehicle network communication or damage to some vehicle functions. However, according to this embodiment of the present disclosure, the in-vehicle communications system can still provide a support in stable and reliable communication when the foregoing problems occur. This avoids safety problems or even driving accidents, and ensures driving safety of the cars, especially the self-driving cars.

According to the first aspect, in a possible embodiment, at least two communication endpoints in the plurality of communication endpoints have a same function or overlapped functions. The at least two communication endpoints are separately communicatively coupled to different gateway devices.

Alternatively, at least two communication endpoints in the plurality of communication endpoints have a same function or overlapped functions. At least one communication endpoint in the at least two communication endpoints is communicatively coupled to at least one gateway device in the plurality of gateway devices, and another communication endpoint in the at least two communication endpoints is communicatively coupled to at least one control device.

The same function or overlapped function means that a specific function of one or more communication endpoints in one group can be completely or partially replaced by a function of one or more communication endpoints in another group. For example, if two cameras of a same model cover the same area, it can be considered that the two cameras have a same image perception function. Alternatively, if cameras of different precisions cover the same area, it can be considered that the cameras have overlapped functions. Alternatively, if the cameras and the laser radar cover the same range, but have different image types, it can be considered that the cameras have overlapped functions.

During implementation of this embodiment of the present disclosure, electronic modules (the sensors, the actuators, a combination of the sensor and the actuator, or the like) that are at an area and that implement a same or similar function are separately coupled to different gateways, or are separately coupled to the gateway and the controller by using two or more links. In this way, when an entire gateway at an area is faulty or fails, an entire controller at an area is faulty or fails, or an entire electronic module coupled to a gateway at an area is faulty or fails, or a link is abnormal, another link that serves as a redundant connection can still implement normal communication. The two-link redundancy backup further improves the safety, reliability, and robustness of vehicle driving.

According to the first aspect, in a possible embodiment, the at least two communication endpoints are located at a same area of a vehicle, and the same area is one of the following: a left front area of the vehicle, a right front area of the vehicle, a left rear area of the vehicle, a right rear area of the vehicle, a front area of the vehicle, a middle area of the vehicle, a rear area of the vehicle, a left area of the vehicle, and a right area of the vehicle.

During implementation of this embodiment of the present disclosure, when one link is abnormal, because the another link can still work appropriately, a detection and sensing capability is still available at the area. This avoids a "full-blind" state that a surrounding environment cannot be sensed at the area because the gateway fails, the controller fails, a control endpoint fails, or the connection line fails. In this way, an emergency measure may be taken to stop the vehicle on a roadside safely, or a self-driving level is reduced to take over the driving by a person. The redundancy backup is performed on two or more communication endpoints with a same function or overlapped functions by using two or more links, to implement a redundant connection design of the communication endpoints, and further improve safety, reliability and robustness of vehicle driving.

According to the first aspect, in a possible embodiment, at least one communication endpoint in the plurality of communication endpoints is communicatively coupled to at least two gateway devices in the plurality of gateway devices separately. Alternatively, at least one communication endpoint in the plurality of communication endpoints is communicatively coupled to at least one gateway device in the plurality of gateway devices, and is also communicatively coupled to at least one control device.

According to the embodiment of the present disclosure, a communication endpoint is coupled to different gateways, or coupled to a gateway and a controller by using two or more links. In this way, when one link is abnormal, because the other links can still work appropriately, the detection and sensing capability is still available at the area. This avoids a "full-blind" state that a surrounding environment cannot be sensed at the area because the gateway fails, the controller fails, a control endpoint fails, or the connection line fails. The redundancy backup is performed on a single communication endpoint by using two or more links, to implement a redundant connection design of the communication endpoints, and further improve safety, reliability and robustness of vehicle driving.

According to the first aspect, in a possible embodiment, the first gateway device is further configured to: when receiving second communication data of the end-to-end communication, route a part or all of the second communication data by using a third communication link indicated by the local routing policy, and route a part or all of the second communication data by using a fourth communication link indicated by the local routing policy.

In other words, for some communication data of the end-to-end communication, all of the communication data may be routed by using each of at least two communication links indicated by the local routing policy. In other words, the communication data is replicated to be transmitted by using different communication links in a multi-link transmission manner. In this way, normal information transmission can be ensured when any link is faulty. This ensures a relatively low communication latency.

For some communication data of the end-to-end communication, the communication data may be separately routed by using at least two communication links indicated by the local routing policy. In other words, different pieces of communication data are transmitted by using different communication links in a multi-link transmission manner. Specifically, selective multi-link transmission may be used, and communication data with high importance, and/or a high priority, and/or a small amount of data is selected and transmitted by using two or more links. In this way, communication load of a link is reduced while a relatively low communication latency is ensured.

According to the first aspect, in a possible embodiment, the control device and one gateway device in the plurality of gateway devices are coupled as a same physical entity or deployed at a same physical position, the control device is communicatively coupled to the gateway device through an internal line, and the control device is communicatively coupled to another gateway device through an external line.

According to the first aspect, in a possible embodiment, there are a plurality of control devices, each control device and a different gateway device in the plurality of gateway devices are coupled as a same physical entity or deployed at a same physical position, each control device is communicatively coupled, through an internal line, to a gateway device coupled to the control device, and each control device is communicatively coupled to another gateway device through an external line.

During implementation of the foregoing embodiments of the present disclosure, the gateway and the controller are coupled or deployed at a same physical position, so that lengths of some physical cables can be reduced, and even some cables can be converted into internal cables of a circuit board. This helps reduce technical difficulties and costs, the in-vehicle communications network based on this design can also provide redundancy in terms of an architecture and a system design, to ensure communication function security, ensure robustness, stability, and reliability of the in-vehicle communications network, and ensure safety of cars, especially self-driving cars.

According to the first aspect, in a possible embodiment, the in-vehicle communications system is disposed on a chassis of the vehicle. For example, the controller and the gateway are deployed in an automobile chassis to form a vehicle-mounted communications chassis. This facilitates adaptation to a plurality of vehicle models.

According to a second aspect, an embodiment of the present disclosure provides an in-vehicle communications system, including a plurality of gateway devices and a plurality of communication endpoints. Each gateway device is communicatively coupled to at least two other gateway devices in the plurality of gateway devices, and each gateway device is communicatively coupled to at least one communication endpoint. N types of functional entities are deployed on at least two gateway devices in the plurality of gateway devices in a distributed manner, at least one of the N types of functional entities is deployed on each gateway device in the at least two gateway devices, a sum of types of functional entities deployed on the at least two gateway devices covers the N types of functional entities, N≥2, and the plurality of gateway devices include a first gateway device. The N types of functional entities are jointly configured to implement a function of a control device, where the function of the control device represents a function of controlling each communication endpoint in the plurality of communication endpoints. The first gateway device is configured to: when receiving first communication data of end-to-end communication, route the first communication data by using a first communication link indicated by a local routing policy, and when the first communication link is abnormal, route a part or all of the first communication data by using a second communication link indicated by the local routing policy.

The end-to-end communication includes at least one of the following: communication between at least two communication endpoints in the plurality of communication endpoints, communication between at least two gateway devices in the plurality of gateway devices, communication between any communication endpoint in the plurality of communication endpoints and any functional entity of the at least two gateway devices, or communication between any gateway device in the plurality of gateway devices and any functional entity of the at least two gateway devices.

When the functional entity is in a software form (for example, a functional module), for example, code of the software may be configured into a chip of the gateway. When the functional entity is in a hardware form, for example, this hardware entity may be coupled to a chip/circuit of the gateway.

It can be learned that in the in-vehicle communications network based on this design, the gateway and some functional modules of the controller are coupled together or deployed at a same physical position. This helps reduce a difference between gateways, increases a reuse degree of the controller, and improves security, robustness, stability, and reliability of vehicle communications. The in-vehicle communications network can also provide redundancy in terms of an architecture and a system design. In addition to providing a network transmission capability when a communication endpoint, a gateway, an interface, or a link is abnormal, the in-vehicle communications network can ensure that logical functions of the controller run appropriately when the gateway is abnormal, so that communication function security is further ensured, and safety of cars, especially self-driving cars, is further improved.

According to the second aspect, in a possible embodiment, each communication endpoint includes at least one of a sensor and an electronic control unit of an actuator.

According to the second aspect, in a possible embodiment, each gateway device in the plurality of gateway devices is coupled in series to a gateway device adjacent to the gateway device, to form a ring communications network. Alternatively, each gateway device is communicatively coupled to all other gateway devices separately, to form a mesh communications network.

According to the second aspect, in a possible embodiment, the local routing policy of the first gateway device is determined based on a network topology of the in-vehicle communications system and a route target of the end-to-end communication.

According to the second aspect, in a possible embodiment, that the first communication link is abnormal specifically includes at least one of the following:

the first communication link fails, the first communication link is congested, or some functions of the first communication link fail.

According to the second aspect, in a possible embodiment, at least two communication endpoints in the plurality of communication endpoints have a same function or overlapped functions, where the at least two communication endpoints are separately communicatively coupled to different gateway devices; or at least one communication endpoint in the at least two communication endpoints is communicatively coupled to at least one gateway device in the plurality of gateway devices, and another communication endpoint in the at least two communication endpoints is communicatively coupled to at least one control device.

Alternatively, at least one communication endpoint in the plurality of communication endpoints is communicatively coupled to at least two gateway devices in the plurality of gateway devices separately, or at least one communication endpoint in the plurality of communication endpoints is communicatively coupled to at least one gateway device in the plurality of gateway devices, and is also communicatively coupled to at least one control device.

It should be noted that for specific content of the possible embodiments of the second aspect, reference is made to related descriptions of the in-vehicle communications system described in the first aspect. Details are not described herein again.

According to a third aspect, an embodiment of the present disclosure provides an in-vehicle communication method. The method is applied to the in-vehicle communications system described in the first aspect. The method includes: A first device receives first communication data of end-to-end communication; the first device detects whether a first communication link indicated by a local routing policy is abnormal; and when detecting that the first communication link is normal, the first device routes the first communication data by using the first communication link indicated by the local routing policy; or when detecting that the first communication link is abnormal, the first device routes a part or all of the first communication data by using a second communication link indicated by the local routing policy.

The first device is any gateway device in the plurality of gateway devices or any control device in the at least one control device.

The end-to-end communication includes at least one of the following: communication between at least two communication endpoints in the plurality of communication endpoints, communication between at least two gateway devices in the plurality of gateway devices, communication between any communication endpoint in the plurality of communication endpoints and the control device, or communication between any gateway device in the plurality of gateway devices and the control device.

According to a fourth aspect, an embodiment of the present disclosure provides another in-vehicle communication method. The method is applied to the in-vehicle communications system described in the second aspect. The method includes: A first device receives first communication data of end-to-end communication; the first device detects whether a first communication link indicated by a local routing policy is abnormal; and when detecting that the first communication link is normal, the first device routes the first communication data by using the first communication link indicated by the local routing policy; or when detecting that the first communication link is abnormal, the first device routes a part or all of the first communication data by using a second communication link indicated by the local routing policy.

The first device is any gateway device in the plurality of gateway devices or any control device in the at least one control device.

The end-to-end communication includes at least one of the following: communication between at least two communication endpoints in the plurality of communication endpoints, communication between at least two gateway devices in the plurality of gateway devices, communication between any communication endpoint in the plurality of communication endpoints and the control device, or communication between any gateway device in the plurality of gateway devices and the control device.

According to a fifth aspect, an embodiment of the present disclosure provides an in-vehicle communications device. The device is specifically a first device, and the first device is any gateway device in the plurality of gateway devices in the in-vehicle communications system according to the first aspect or any control device in the at least one control device; or any gateway device in the plurality of gateway devices in the in-vehicle communications system or any control device in the at least one control device according to the second aspect.

The device includes a memory, a communications interface, and a processor coupled to the memory and the communications interface. The memory is configured to store instructions, the processor is configured to execute the instructions, and the communications interface is configured to communicate with another device in the in-vehicle communications system under control of the processor. The processor is specifically configured to perform the steps in the method according to the third aspect or the fourth aspect when executing the instructions.

According to a sixth aspect, an embodiment of the present disclosure provides a non-volatile computer-readable storage medium. The computer-readable storage medium is configured to store code of implementing the method according to the third aspect or the fourth aspect. When the program code is executed by a computer, the computer is configured to implement the method described in the third aspect or the fourth aspect.

According to a seventh aspect, an embodiment of the present disclosure provides a computer program product. The computer program product includes program instructions. When the computer program product is executed by a computer, the computer performs the method described in the third aspect or the fourth aspect. The computer program product may be a software installation package. When the method provided in the design of the third aspect or the fourth aspect needs to be used, the computer program product may be downloaded and executed on the computer, to implement the method described in the third aspect or the fourth aspect.

It can be seen that the in-vehicle communications network architecture provided in the present disclosure can provide redundancy in terms of an architecture and a system design. In a normal case, a device (for example, the gateway or the controller) in the in-vehicle communications network may select an optimal/shortest communication link based on a network topology to implement communication, so that a communication requirement for low-latency transmission between the gateway and the controller and between the gateways can be ensured. When a gateway, a controller, a communication endpoint, an interface, or a connection line is abnormal, a network transmission capability can be provided. This ensures communication function security, improves robustness, stability and reliability of the in-vehicle communications network, and improves safety of cars, especially self-driving cars.

BRIEF DESCRIPTION OF DRAWINGS

To describe the technical solutions in the embodiments of the present disclosure or the solution described in the BACKGROUND more clearly, the following describes the accompanying drawings in the embodiments of the present disclosure or the BACKGROUND.

FIG. 3 is a schematic architectural diagram of an in-vehicle communications system according to an embodiment of the present disclosure;

FIG. 4a and FIG. 4b are schematic diagrams of a star network and a ring network according to an embodiment of the present disclosure;

DESCRIPTION OF EMBODIMENTS

The following describes the embodiments of the present disclosure with reference to the accompanying drawings in the embodiments of the present disclosure. Terms used in the embodiments of the present disclosure are only used to explain specific embodiments of the present disclosure, but are not intended to limit the present disclosure.

Function security is highly required on an automobile when it is in a high-speed driving state. Automobiles, especially those that support advanced driver assistance systems (Advanced Driver Assistant System, ADAS) or even autonomous vehicles (AV), such as coupled cars (connected car), intelligent cars (smart/intelligent car), digital cars (digital car), unmanned cars (unmanned car, driverless car, pilotless car/automobile), and internet of vehicles (Internet of vehicles, IoV) are transformed from manual driving to automatic driving, and function security is highly required on an in-vehicle network. Because an electrical/electronic control unit is important, especially for self-driving cars, an in-vehicle communications network needs to meet the highest ASIL-D standard specified in ISO26262. A function security design needs to be considered in R&D concept and system design phases.

Figure 1:
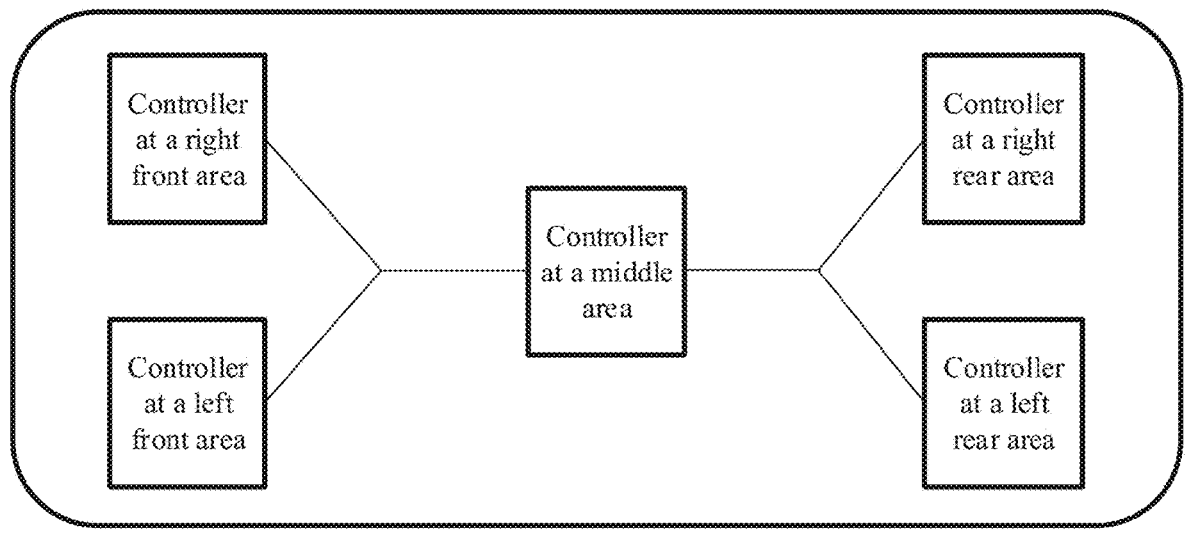
FIG. 1 is a schematic architectural diagram of an existing in-vehicle communications system.

An existing in-vehicle communications network usually has a distributed network architecture based on an ECU control bus as a main connection technology. FIG. 1 shows a design solution of an existing in-vehicle communications network. As shown in FIG. 1, an automobile is divided into at least five control areas (a left front area, a right front area, a left rear area, a right rear area, and a middle area) based on a physical position. An in-vehicle communications network system correspondingly includes at least five area controllers and at least five sub-controllers. Each area controller is disposed at a different control area of the automobile, and surrounding area controllers (for example, area controllers at the left front area, the right front area, the left rear area, and the right rear area) are separately coupled to a controller at the middle area. Each area controller corresponds to at least one sub-controller (not shown in FIG. 1), and is set at a control area at which the corresponding area controller is located. A sub-controller at each control area is configured to: provide a detection signal to an area controller at the control area, and control various types of actuators at the control area based on a control signal of the area.

However, theoretically, electronic components such as the chip of the controller, the cable, the interface, and a connector may fail randomly, or various types of electronic components may be loose, disconnected, or damaged during bumping, or some electronic components may be faulty or damaged after a car collision. These possibilities may cause interruption of in-vehicle network communication or damage to some vehicle functions, and easily cause a safety problem or even a driving accident to cars, especially self-driving cars.

To improve safety of the cars, especially the self-driving cars, the embodiments of the present disclosure provide some new in-vehicle communications networks, to help resolve the foregoing technical problems. Therefore, low-latency, robust, and stable and reliable communication can be ensured during vehicle driving, and driving safety can be ensured in the in-vehicle communications network. The in-vehicle communications network is mainly an in-vehicle wired communications network, especially an in-vehicle communications network of the self-driving car.

Figure 2:
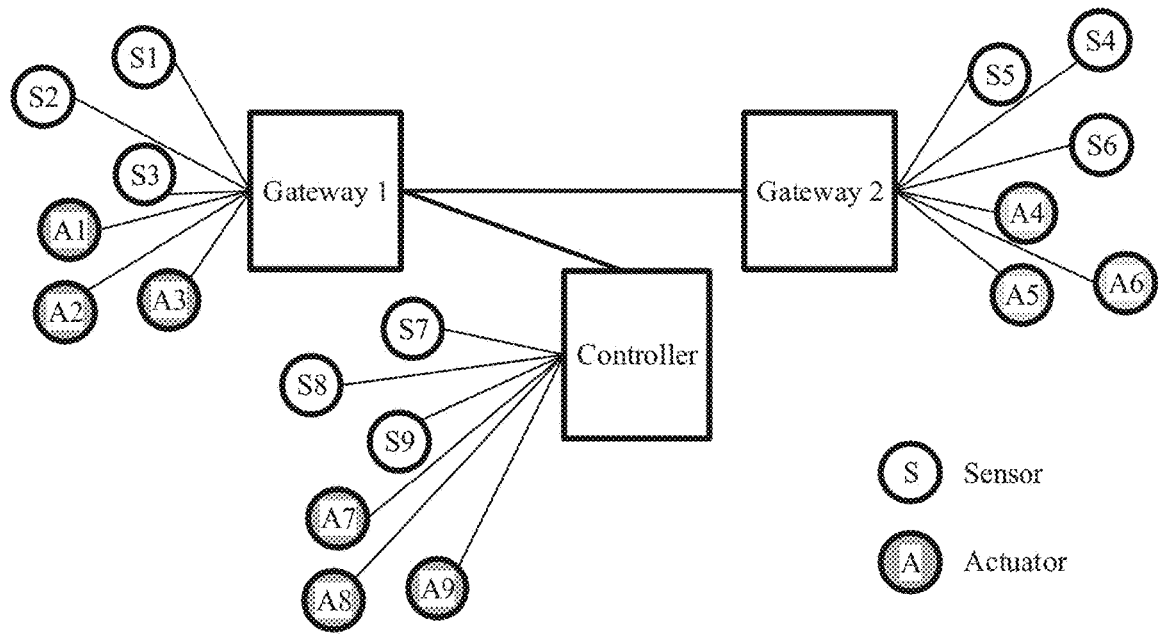
FIG. 2 is a schematic diagram of a controller, a gateway, and a communication endpoint according to an embodiment of the present disclosure.

Referring to FIG. 2, a device in an in-vehicle communications network in an embodiment of the present disclosure includes at least a plurality of communication endpoints, a plurality of gateway devices, and a control device.

(1) The communication endpoint in this specification indicates a functional device that is in a vehicle and that has a communication function and can detect an environment or perform a specific function. The vehicle may include a plurality of communication endpoints, and the communication endpoints are communicatively coupled to a gateway device (which may be referred to as a gateway for short) or a control device (which may be referred to as a controller for short).

The communication endpoint may be, for example, a sensor. The sensor is configured to collect related data of the environment. The sensor may be, for example, a millimeter-wave radar, a laser radar, an ultrasonic radar, a camera, a positioning system (for example, a GPS or a beidou positioning system), an inertial sensor, a speed sensor, an acceleration sensor, a humidity sensor, a light intensity sensor in a vehicle. A specific type and a specific quantity of sensors are not limited in the present disclosure.

The communication endpoint may be, for example, an electric control unit (Electric Control Unit, ECU) of an actuator in the vehicle. The ECU is usually an electronic unit that is in the vehicle and that has calculation and control functions, controls one function or a plurality of functions, and sends information or a command to the actuator or another controlled component. The ECU may be, for example, an ECU of a servo motor, an ECU of a hydraulic device, or an ECU of a dedicated system. The dedicated system is, for example, an anti-lock braking system (Anti-lock Braking System, ABS) or an electronic stability program (Electronic Stability Program, ESP). Various ECUs are hereinafter referred to as actuators for short, and a specific type and a specific quantity of actuators are not limited in the present disclosure.

(2) The gateway device in this specification is referred to as a gateway for short. The gateway is responsible for a route switching function of communication data of end-to-end communication in the in-vehicle communications network. The gateway may be, for example, a switch or a router. There are a plurality of gateways, and the gateways may be deployed at different positions in the vehicle. In this embodiment of the present disclosure, the gateway may be independently deployed, or may be integrated and deployed together with the controller.

The end-to-end communication includes at least one of the following: communication between at least two communication endpoints in the plurality of communication endpoints, communication between at least two gateway devices in the plurality of gateway devices, communication between any communication endpoint in the plurality of communication endpoints and the control device, or communication between any gateway device in the plurality of gateway devices and the control device.

(3) The control device in this specification may be referred to as a controller for short. The controller may include one or more central processing units (Central Processing Unit, CPU). The CPU may be a single-core CPU, or may be a multi-core CPU. The controller may be, for example, an in-vehicle computing platform, an in-vehicle computer, a domain controller, or a multi-domain controller (for example, a self-driving controller or an information entertainment controller). The controller is responsible for data calculation, fusion, storage, decision-making (decision making), and the like of vehicle-related functions. The controller may be configured to control each communication endpoint. The control may be represented as: receiving and processing probe data of some sensors, receiving and processing probe data of some actuators, controlling some actuators according to a control instruction, and controlling some sensors according to a control instruction. In self-driving, functions such as intelligent driving, an intelligent cockpit, and vehicle control of the vehicle may be implemented. In this embodiment of the present disclosure, the controller may be independently deployed, or may be integrated and deployed together with the gateway, or may be deployed on different gateways in a distributed manner.

It may be understood that, in a specific application scenario, the communication endpoint, the gateway, or the controller may be abnormal (for example, a failure or a fault), and a connection line, a cable, or an interface in a communication link may be abnormal (for example, a failure, a fault, congestion, or a disconnection). As shown in FIG. 2, a connection between the sensor/actuator and the gateway, a connection between the sensor/actuator and the controller, a connection between a gateway 1 and a gateway 2, or a connection between a gateway 1 and the controller may be abnormal, the gateway 1 and gateway 2 may be faulty, one or more sensors or actuators may be faulty, and even a chip of the controller may be abnormal. These exceptions may be caused by various reasons, for example, a device/a line/an interface is aged, line congestion may be caused by a complex communication scenario, and loosening/falling/damage/disconnection of an electronic component may be caused by collision/bump during running of the vehicle.

The following describes in detail specific designs of some in-vehicle communications systems provided in the embodiments of the present disclosure.

First, FIG. 3 is a schematic structural diagram of an in-vehicle communications system according to an embodiment of the present disclosure. The in-vehicle communications system may be disposed on a chassis of a vehicle (for example, a controller and a gateway are deployed on the chassis of the vehicle to form an in-vehicle communications chassis, so as to facilitate adaptation to a plurality of vehicle models). The in-vehicle communications system includes at least one control device (in FIG. 3, one control device is used as an example), a plurality of gateways (in FIG. 3, a gateway 1, a gateway 2, a gateway 3, and a gateway 4 are used as an example), and a plurality of communication endpoints. Each gateway device may be communicatively coupled to one or more communication endpoints, and the control device may be communicatively coupled to one or more communication endpoints. It should be noted that FIG. 3 merely shows an example of a plurality of sensors and a plurality of actuators that are coupled to the gateway 1 and the gateway 2. A quantity, a type, and a deployment position of sensors/actuators that are coupled to each gateway and each controller are not limited in the present disclosure. In addition, "a plurality of gateways" mentioned in this specification may be all gateways actually deployed in the vehicle, or may be some of all gateways actually deployed in the vehicle.

Each gateway is communicatively coupled to the controller, and each gateway is coupled to the controller to form a star network. As shown in FIG. 4a, the gateway 1, the gateway 2, the gateway 3, and the gateway 4 are separately coupled to the controller to form a star communications network (a star network for short). In a normal case (no exception occurs), the connection (the star network) between each gateway and the controller is mainly used for data communication between the gateway and the controller. Communication data between the gateway and the controller may be sent by a sensor or an actuator that accesses the gateway in a convergence manner, or may be service data or control data generated by the gateway, or may be service data or control data generated by the controller for the sensor, the actuator, or the gateway, or may be any communication data that is of end-to-end communication and that is forwarded by a secondary communication link.

Each gateway is also coupled to two adjacent gateways to form a ring network. As shown in FIG. 4b, the gateway 1, the gateway 2, the gateway 3, and the gateway 4 are coupled in a head-to-tail manner to form a ring communications network (a ring network for short). In a normal case, the connection (the ring network) between gateways is mainly used for data communication between different gateways. Communication data between the gateways may be sent by a sensor or an actuator that accesses the gateway in a convergence manner, or may be service data or control data generated by the gateway, or may be any communication data that is of end-to-end communication and that is forwarded by a secondary communication link.

A communication connection between a communication endpoint (a sensor/an actuator) and a gateway may be a wired connection or a wireless connection, a communication connection between a communication endpoint (a sensor/an actuator) and a controller may be a wired connection or a wireless connection, a communication connection between gateways may be a wired connection, a communication connection between a gateway and a controller may be a wired connection, and the wired connection may be, for example, a cable connection or a bus connection.

For example, in FIG. 3, a link 5, a link 6, a link 7, and a link 8 respectively represent wired connections between the gateways, and a link 1, a link 2, a link 3, and a link 4 respectively represent wired connections between the gateways and the controller.

For example, in a normal case, a self-driving sensor (for example, a camera) in a plurality of communication endpoints coupled to the gateway 1 may generate an image and/or point cloud data and/or object data. The image and/or the point cloud data and/or the object data are/is aggregated to the gateway 1, and then the gateway 1 sends the image and/or the point cloud data and/or the object data to the controller by using the connection (the link 1) between the gateway 1 and the controller. The controller may return control information. The control information is sent to the camera by using the connection (the link 1) between the gateway 1 and the controller and a connection between the gateway 1 and the camera, so as to adjust an operating parameter of the camera.

For another example, in a normal case, it is assumed that the controller is a self-driving controller, and the controller sends a braking command to a brake control ECU in a plurality of communication endpoints coupled to the gateway 1. The braking command is sent to the brake control ECU through the gateway 1 by using the connection (the link 1) between the controller and the gateway 1.

For another example, in a normal case, there is an acceleration sensor in a plurality of communication endpoints coupled to the gateway 1, and there is a dedicated ECU for a vehicle stabilization system in a plurality of communication endpoints coupled to the gateway 4. The dedicated ECU for the vehicle stabilization system requires information about the acceleration sensor. The information about the acceleration sensor is sent to the gateway 1, then sent to the gateway 4 by using the connection (the link 8) between the gateway 1 and the gateway 4, and finally sent to the dedicated ECU for the vehicle stabilization system by the gateway 4. The information does not need to be processed by the controller, and communication is completed through forwarding by the gateway 1 and the gateway 4.

For another example, in a normal case, a main radar sensor and a target recognition and anti-collision emergency brake ECU of the main radar sensor in a plurality of communication endpoints coupled to the gateway 2 need to send an emergency braking control message to a brake control ECU in a plurality of communication endpoints coupled to the gateway 4. The emergency braking control message is sent to the gateway 2, then sent to the gateway 3 by using the connection (the link 6) between the gateway 2 and the gateway 3, then sent to the gateway 4 by using the connection (the link 7) between the gateway 3 and the gateway 4, and finally sent to the brake control ECU by the gateway 4. The message does not need to be processed by the controller either, and communication may be completed through forwarding by the gateway 2, the gateway 3, and the gateway 4.

In this embodiment of the present disclosure, when any connection line, cable, or interface in the communication link is abnormal, for example, when the connection between gateways is invalid, faulty, congested, or disconnected, or when the connection between the gateway and the controller is invalid, faulty, congested, or disconnected, the star network and the ring network may jointly implement redundant transmission.

When any connection in the star network is abnormal, the gateway may change, according to a local routing policy, a communication link used to route communication data, and route the communication data through the ring network.

For example, for some communication data, a communication link of the communication data is "the gateway 1-the controller". When the link 1 is abnormal, the gateway 1 may detect a failure of the link 1 according to a detection method, for example, for a physical layer, a MAC layer, or a component failure. Then, the gateway 1 changes the communication link to "the gateway 1-the gateway 2-the controller" according to the local routing policy. In this way, the communication data of the gateway 1 may be sent to the controller by using the link 5 and the link 2. Alternatively, the gateway 1 changes the communication link to "the gateway 1-the gateway 4-the controller", so that the communication data of the gateway 1 may be sent to the controller by using the link 8 and the link 4.

When any connection in the ring network is abnormal, the gateway may change, according to the local routing policy, a communication link used to route communication data, and route the communication data through the star network or the ring network.

For example, for some communication data, a communication link of the communication data is "the gateway 1-the gateway 2". When the link 5 is abnormal, the gateway 1 may detect a failure of the link 5 according to a detection method, for example, for a physical layer, a MAC layer, or a component failure. Then, the gateway 1 changes the communication link to "the gateway 1-the controller-the gateway 2" according to the local routing policy. In this way, the communication data of the gateway 1 may be sent to the gateway 2 by using the link 1 and the link 2.

For another example, for some communication data, a communication link of the communication data is "the gateway 1-the gateway 2-the gateway 3". When the link 5 is abnormal, the gateway 1 may detect a failure of the link 5 according to a detection method, for example, for a physical layer, a MAC layer, or a component failure. Then, the gateway 1 changes the communication link to "the gateway 1-the gateway 4-the gateway 3" according to the local routing policy. In this way, the communication data of the gateway 1 may be sent to the gateway 3 by using the link 8 and the link 7. Alternatively, the communication link is changed to "the gateway 1-the controller-the gateway 3", so that the communication data of the gateway 1 may be sent to the gateway 3 by using the link 1 and the link 3.

It can be learned that the in-vehicle communications network architecture provided in the present disclosure can provide redundancy in terms of an architecture and system design. In a normal case, a device (for example, the gateway or the controller) in the in-vehicle communications network may select an optimal/shortest communication link based on a network topology to implement communication, so that a communication requirement for low-latency transmission between the gateway and the controller and between the gateways can be ensured. In addition, when a gateway, an interface, or a link is abnormal, a network transmission capability can still be provided, and redundant transmission is implemented through both the star network and the ring network. This ensures communication function security, improves robustness, stability, and reliability of the in-vehicle communications network, and improves safety of cars, especially self-driving cars.

Further, in this embodiment of the present disclosure, when any connection line, cable, or interface in the communication link is abnormal, for some communication data, the gateway may change a transmission policy based on factors such as a service priority, a service importance degree, and impact on safety, and transmit only some information in the communication data. In other words, the star network or the ring network is used to route a part of the communication data.

For example, when the link 1 is abnormal, because the gateway 1 needs to perform forwarding by using the gateway 2 or the gateway 4 and the links coupled to the gateway 2 or the gateway 4, load of the gateway 2 or the gateway 4 and the links coupled to the gateway 2 or the gateway 4 may exceed designed load. In this case, a part of communication data may be transmitted through redundancy in the star network and the ring network. For example, the camera generates image data (Raw Data) and object data (Obj information) and transmits the image data and the object data to the gateway 1. The image data and the object data need to be sent to the controller. When detecting that the link 1 is abnormal, the gateway 1 may change the communication link and transmit only the Obj information to the controller.

During implementation of this embodiment, communication load of a gateway and a link in a new communication link can be reduced, and the cars are enabled to implement, based on important information (for example, the Obj information), subsequent behaviors such as emergency handling, pulling over, and turning on emergency flashers for giving an alarm, so that safety, reliability, and robustness of vehicle driving can be further ensured.

Further, as described above, when a gateway, an interface, or a link is abnormal, the gateway needs to detect the abnormality, and changes the communication link according to the local routing policy, and/or transmits only a part of communication data. These processing processes may cause a latency. In this embodiment of the present disclosure, the following manner may be used to reduce or eliminate the latency.

For some communication data of end-to-end communication, all of the communication data is routed by using each of at least two communication links indicated by the local routing policy. In other words, the communication data is replicated to be transmitted by using different communication links in a multi-link transmission manner.

For example, a camera is coupled to the gateway 1, and a destination device of communication data of the camera is the controller. After receiving the communication data from the camera, the gateway 1 may make two copies of the communication data. One copy is directly transmitted to the controller by using the link 1. The other copy is forwarded to the controller by using the gateway 2. In this way, information can be normally transmitted when any link is faulty, so that a relatively low communication latency is ensured.

Still further, the gateway may perform selective multi-link transmission, select communication data with high importance, and/or a high priority, and/or a small amount, and transmit the communication data by using two or more links. In this way, communication load of a link is reduced while a relatively low communication latency is ensured.

For example, if a camera generates image data (Raw Data) and object data (Obj information), the raw data may be transmitted by using a single link, and the Obj information may be transmitted by using two or more links. For another example, common control information may be transmitted by using a single link, and control information of the controller may be transmitted by using a plurality of links.

Further, as described above, when some functions of a gateway fail, a switching capability of the gateway may decrease, or a traffic capability of a line port may decrease, or a switching capability of the gateway may decrease. In this case, the gateway may change a communication link, or transmit data with a high priority or high importance, or transmit data in a data splitting manner.

Specifically, communication data may be divided into two or more parts of data. The parts of data in the communication data may be separately routed by using two or more communication links indicated by the local routing policy. In this way, communication load of a link is reduced while a relatively low communication latency is ensured.

For example, if a camera generates image data (Raw Data) and object data (Obj information), the raw data may be transmitted by using one link, and the Obj information may be transmitted by using another link. For another example, common control information may be transmitted by using a single link, control information of the controller may be transmitted by using a plurality of links.

Figure 5:
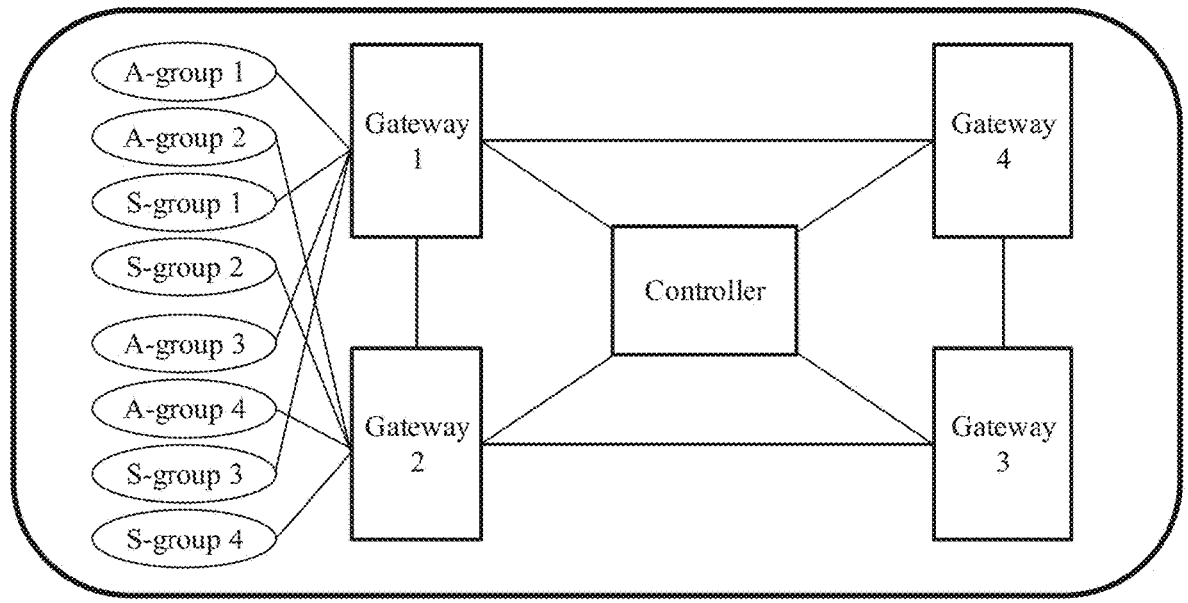
FIG. 5 is a schematic architectural diagram of another in-vehicle communications system according to an embodiment of the present disclosure.

Based on the in-vehicle communications system shown in FIG. 3, a redundant connection between communication endpoints may be further implemented. FIG. 5 is a schematic structural diagram of another in-vehicle communications system according to an embodiment of the present disclosure. A main difference from the in-vehicle communications system shown in FIG. 3 lies in that communication endpoints used for sensing related to self-driving at some areas of a vehicle are grouped, and different groups are coupled to different gateways. When one of the gateways fails, because another gateway can still work appropriately, a detection and sensing capability is still available in this area. This avoids a "full-blind" state that a surrounding environment cannot be sensed at the area because the gateway fails. In this way, an emergency measure can be taken to stop the vehicle on the roadside safely, or a self-driving level is reduced to take over the driving by a person. Alternatively, one group may be coupled to a gateway, and another group may be coupled to the controller. When a link coupled to the controller is abnormal, the detection and sensing capability can be still available due to the connection of the gateway.

Each group includes at least one communication endpoint. For at least two groups that are mutually used as redundant connections, overall functions of the at least two groups are the same, similar, or overlapped. It may be understood that, when each of the at least two groups includes only one communication endpoint, in other words, the at least two communication endpoints have the same, similar, or overlapped function, and the at least two communication endpoints are separately communicatively coupled to different gateway devices.

The same function or overlapped function means that a specific function of one or more communication endpoints in one group can be completely or partially replaced by a function of one or more communication endpoints in another group. For example, if two cameras of a same model cover the same area, it can be considered that the two cameras have a same image perception function. Alternatively, if cameras of different precisions cover the same area, it can be considered that the cameras have overlapped functions. Alternatively, if the cameras and the laser radar cover the same range, but have different image types, it can be considered that the cameras have overlapped functions.

At least two groups that are mutually used as redundant connections may be located at a same area of the vehicle. The same area is, for example, one of a left front area of the vehicle, a right front area of the vehicle, a left rear area of the vehicle, a right rear area of the vehicle, a front area of the vehicle, or a middle area of the vehicle, a rear area of the vehicle, a left area of the vehicle, or a right area of the vehicle. It should be noted that in some embodiments, vehicle areas may be divided in a manner of front/rear/left/right/middle, front/middle/rear, left/middle/right, front/rear, or left/right. This is not limited in the present disclosure.

For example, if a plurality of ADAS (Advanced Driver Assistant System, advanced driver assistant system) sensors are disposed at the right front area of the vehicle, because these ADAS sensors have a same or similar detection range, these sensors are grouped into different groups, and are separately coupled to different gateways (for example, the gateway 1 and the gateway 2). Similarly, if sensors such as a plurality of cameras, a plurality of millimeter-wave radars, a plurality of laser radars, and a plurality of ultrasonic radars are disposed at an area, different cameras, different millimeter-wave radars, different laser radars, different ultrasonic radars, and the like may also be grouped into different groups, so that different gateways can be coupled. Similarly, a plurality of actuators with same or similar functions may also be grouped into different groups to be coupled to different gateways.

A grouping dimension may be as follows: Some groups each include only at least one sensor, and/or some groups each include only at least one actuator, and/or some groups each include at least one sensor and at least one actuator.

Figure 6:
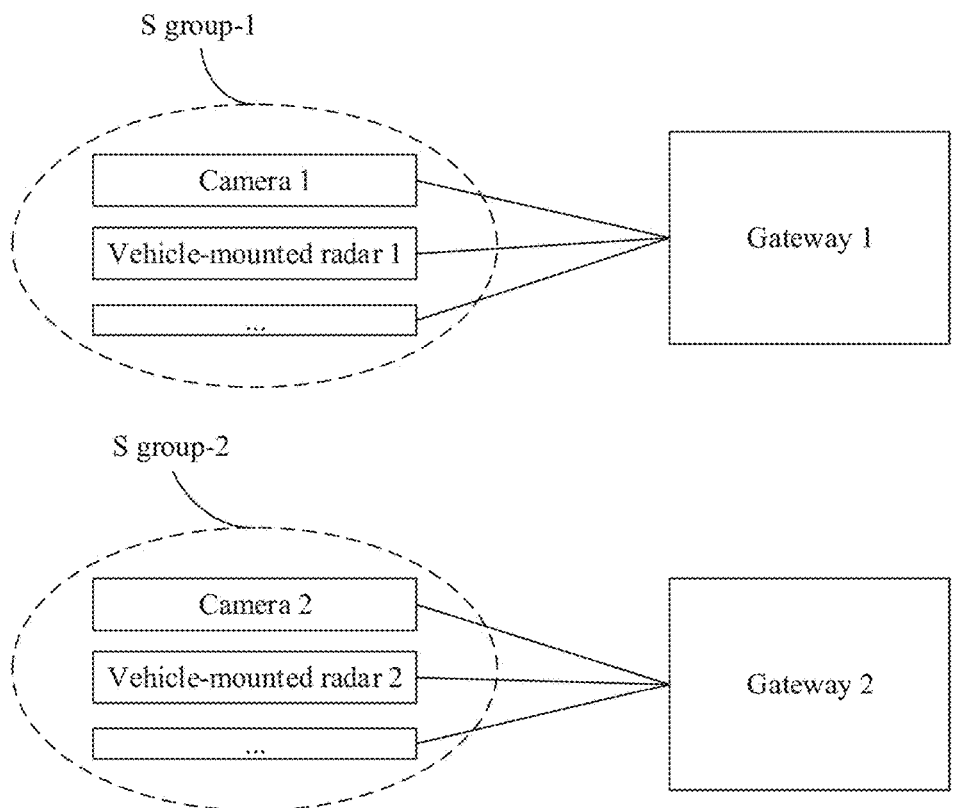
FIG. 6 is an example diagram of a scenario of implementing a redundancy backup of a communication endpoint according to an embodiment of the present disclosure.

In the example shown in FIG. 5, the front right area of the vehicle includes two pairs of groups that are mutually used as redundant connections. One pair is an S-group 1 and an S-group 2. The S-group 1 and the S-group 2 each include at least one sensor, and the S-group 1 and the S-group 2 are respectively coupled to the gateway 1 and the gateway 2. Further, as shown in FIG. 6, the S-group 1 may include sensors such as a camera 1 and a vehicle-mounted radar 1, and each sensor is coupled to the gateway 1. The S-group 2 may include sensors such as a camera 2 and a vehicle-mounted radar 2, and each sensor is coupled to the gateway 2. The other pair is an A-group 1 and an A-group 2. The A-group 1 and the A-group 2 each include at least one actuator, and the A-group 1 and the A-group 2 are respectively coupled to the gateway 1 and the gateway 2.

A grouping principle may be: based on a detection range, and/or based on a detection distance, and/or based on a sensor type, and/or based on a sensor application scenario, and/or based on an implemented self-driving function.

Figure 7:
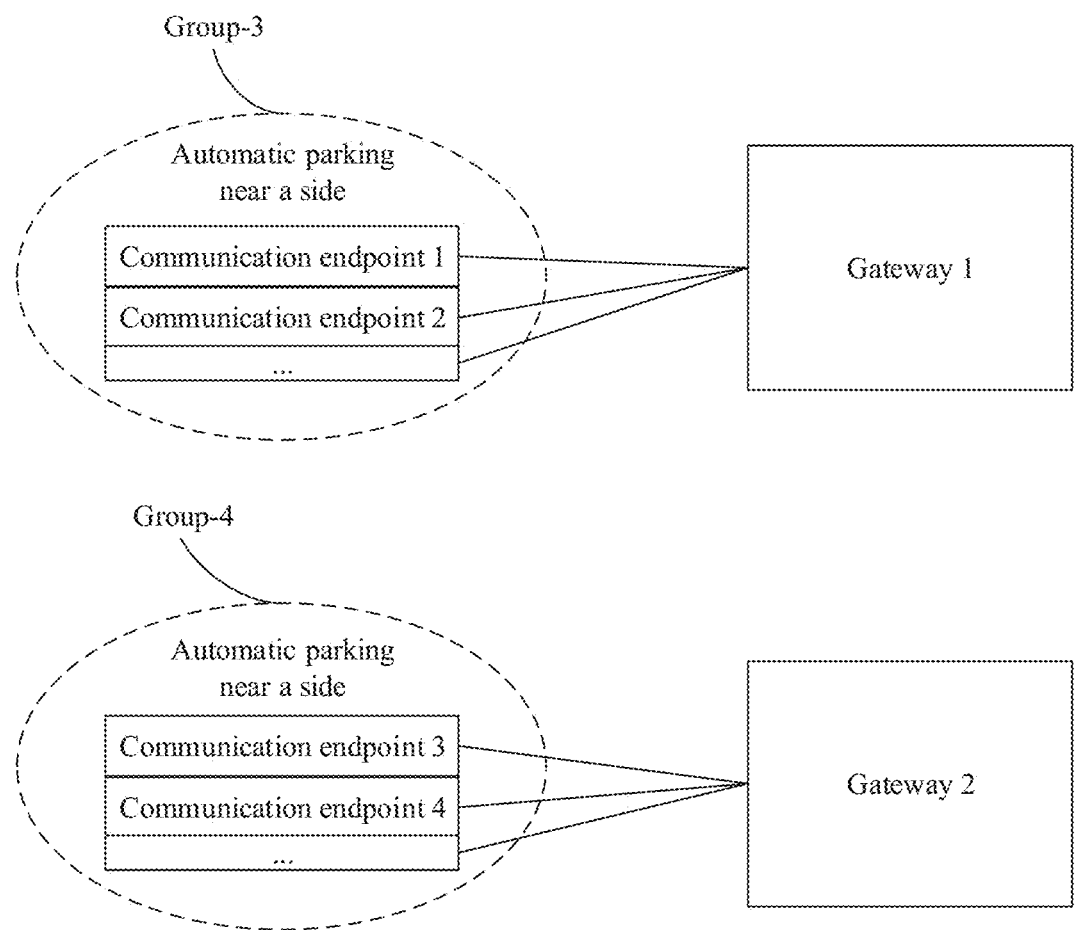
FIG. 7 is an example diagram of another scenario of implementing a redundancy backup of a communication endpoint according to an embodiment of the present disclosure.

For example, as shown in FIG. 7, in the left front area of the vehicle, a minimum set of sensors that can complete automatic pulling over is grouped into two groups, that is, a group-3 and a group 4. The group-3 includes a communication endpoint 1, a communication endpoint 2, and the like, and the group-4 includes a communication endpoint 1, a communication endpoint 2, and the like. Both the group-3 and the group 4 may be configured to implement an automatic pulling over function. In this case, each communication endpoint in the group-3 is separately coupled to the gateway 1, and each communication endpoint in the group-4 is separately coupled to the gateway 2.

For another example, a minimum set of sensors that can complete pulling over at night is grouped into two groups. The two groups are coupled to two or more different gateways. The minimum set of sensors that can complete pulling over at night may be different from a minimum set of sensors that can complete pulling over at daytime. For example, radar assistance is required when a sight line is blocked at night.

For another example, two or more GPSs are disposed on a vehicle as positioning inputs or grand masters (grand master), and the two or more GPSs are respectively coupled to different gateways.

It should be noted that the embodiments in FIG. 5, FIG. 6, and FIG. 7 are merely used to explain the solutions in the embodiments of the present disclosure. In the present disclosure, vehicle areas that need to be grouped, a quantity of groups, the grouping dimension, the grouping principle, a communication endpoint in each group, a position of a coupled gateway, and a quantity of gateways that are mutually used as redundant connections are not limited.

According to this embodiment of the present disclosure, electronic modules (the sensors, the actuators, a combination of the sensor and the actuator, or the like) that implement the same or similar function at an area are grouped, and the electronic modules in different groups are coupled to different gateways. When an entire gateway at an area is faulty or fails, or when an entire group of electronic modules coupled to a gateway at an area is faulty or invalid, or a link is abnormal, another group that is used as a redundant connection can still implement normal communication by using another gateway. This further improves safety, reliability, and robustness of vehicle driving.

Figure 8:
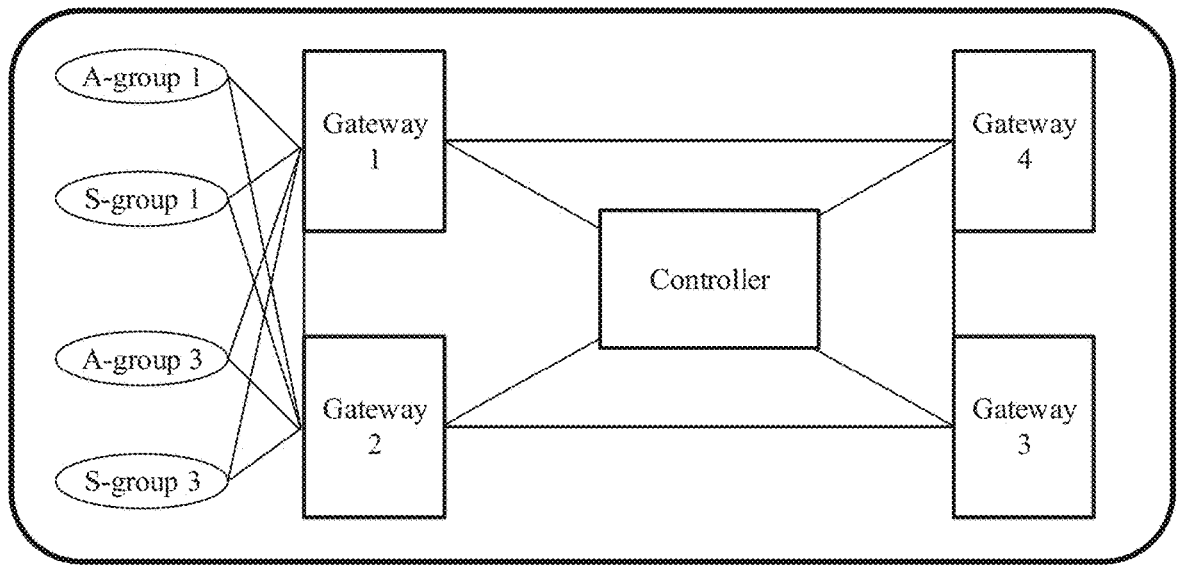
FIG. 8 is a schematic architectural diagram of another in-vehicle communications system according to an embodiment of the present disclosure.

It should be noted that, based on the in-vehicle communications network shown in FIG. 8, the in-vehicle communications network may also be further improved/deformed. For example, for at least two groups of redundant connections, at least one group is communicatively coupled to a gateway, and remaining groups are communicatively coupled to a controller. In this way, for example, for the two groups that are mutually used as redundant connections, when a connection between one group and the gateway is abnormal, the other group may implement communication between the controller and a communication endpoint by using the controller. Similarly, when a connection between one group and the controller is abnormal, the other group may implement communication between the gateway and the communication endpoint by using the gateway. For a detailed implementation process, refer to the foregoing description of the embodiment in FIG. 8. Details are not described herein again.

Based on the in-vehicle communications system shown in FIG. 3, an embodiment of the present disclosure provides still another design for implementing a redundant connection between communication endpoints. FIG. 8 is a schematic structural diagram of another in-vehicle communications system according to an embodiment of the present disclosure. A main difference from the in-vehicle communications system shown in FIG. 3 lies in that at least one group of communication endpoints at some areas of a vehicle are all coupled to a plurality of gateways. In this way, when one gateway fails, because another gateway can still work appropriately, a detection and sensing capability is still available in this area. This avoids a "full-blind" state that a surrounding environment cannot be sensed at the area because the gateway fails.

Each group includes at least one communication endpoint, and the at least one communication endpoint is communicatively coupled to at least two gateway devices separately. Each sensor and/or each actuator in the group may be coupled to different gateways by using two or more physical connections or a bus, and transmit same information at the same time. When one link fails, information on the other link can ensure normal working of a system.

For example, as shown in FIG. 8, a right front area of the vehicle includes an A-group 1, an S-group 1, and the like.

The S-group 1 includes at least one sensor, and each sensor is separately coupled to a gateway 1 and a gateway 2. The A-group 1 includes at least one actuator, and each actuator is separately coupled to the gateway 1 and the gateway 2.

It should be noted that the embodiment in FIG. 8 is merely used to explain the solution in this embodiment of the present disclosure. In the present disclosure, vehicle areas that need to be grouped, a quantity of groups, a communication endpoint in each group, a position of a coupled gateway, and a quantity of gateways that are mutually used as redundant connections are not limited.

During implementation of this embodiment of the present disclosure, the sensor/actuator is coupled to different gateways by using two or more links. When an entire gateway at an area is faulty or invalid, or one link of a sensor/actuator coupled to a gateway at an area is abnormal, another link that is used as the redundant connection can still implement normal communication by using another gateway. This further improves safety, reliability, and robustness of vehicle driving.

It should be noted that, based on the in-vehicle communications network shown above, the in-vehicle communications network may also be further improved/deformed. For example, for a communication endpoint in a group, the communication endpoint may be coupled to the controller and at least one gateway by using two or more physical connections or a bus. In this way, when a connection between the communication endpoint and the controller is abnormal, the communication endpoint may implement communication between the gateway and the communication endpoint by using the gateway. When the connection between the communication endpoint and the gateway is abnormal, the communication endpoint may implement communication between the controller and the communication endpoint by using the gateway.

Figure 9:
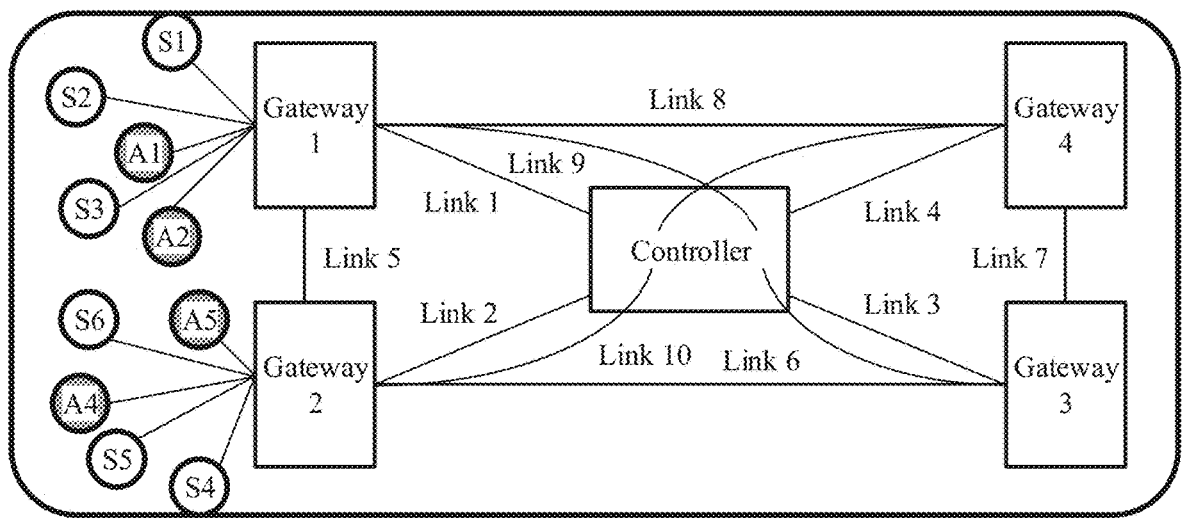
FIG. 9 is a schematic architectural diagram of another in-vehicle communications system according to an embodiment of the present disclosure.
Figure 10:
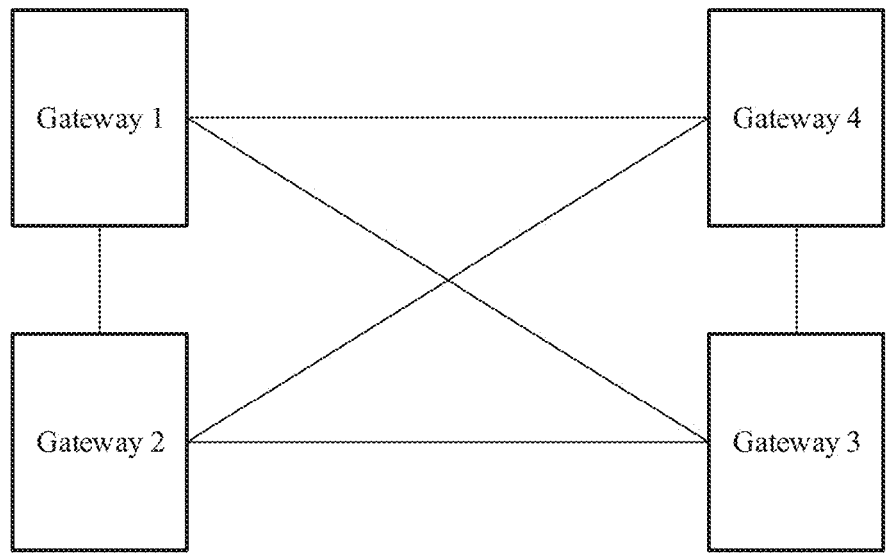
FIG. 10 is a schematic diagram of a mesh network according to an embodiment of the present disclosure.

Based on the in-vehicle communications system shown in FIG. 3, a redundant connection between gateways may be further enhanced. FIG. 9 is a schematic structural diagram of another in-vehicle communications system according to an embodiment of the present disclosure. A main difference from the in-vehicle communications system shown in FIG. 3 lies in that in a plurality of gateways in the in-vehicle communications system, each gateway is communicatively coupled to all other gateways, so that a mesh communications network (a mesh network for short) is formed. As shown in FIG. 10, for a gateway 1, a gateway 2, a gateway 3, and a gateway 4, each two of the gateways are coupled to form a mesh network. Compared with redundant connections in a ring network, more redundant connections in the mesh network are added.

In a normal case, the connection (the ring network) between gateways is mainly used for data communication between different gateways. Communication data between the gateways may be sent by a sensor or an actuator that accesses the gateway in a convergence manner, or may be service data or control data generated by the gateway, or may be any communication data that is of end-to-end communication and that is forwarded by a secondary communication link.

The communication connection between the gateways may be a wired connection. For example, in FIG. 9, a link 5, a link 6, a link 7, a link 8, a link 9 and a link 10 respectively represent wired connections between gateways.

It should be noted that, based on the in-vehicle communications network shown in FIG. 9, the in-vehicle communications network may also be further improved/deformed. For example, a part of communication data is transmitted when an exception occurs. For another example, a redundant connection of a communication endpoint is added. For specific implementation, refer to the foregoing descriptions of related improvements/deformation. Details are not described herein again.

It can be seen that the in-vehicle communications network architecture provided in the present disclosure can provide redundancy in terms of an architecture and a system design. In a normal case, a device (for example, the gateway or the controller) in the in-vehicle communications network may select an optimal/shortest communication link based on a network topology to implement communication, so that a communication requirement for low-latency transmission between the gateway and the controller and between the gateways can be ensured. When a communication endpoint, a gateway, an interface, or a link is abnormal, a network transmission capability can still be provided, and redundant transmission is implemented jointly through the star network and the mesh network. This ensures communication function security, improves robustness, stability, and reliability of the in-vehicle communications network, and improves safety of cars, especially self-driving cars.

Figure 11:
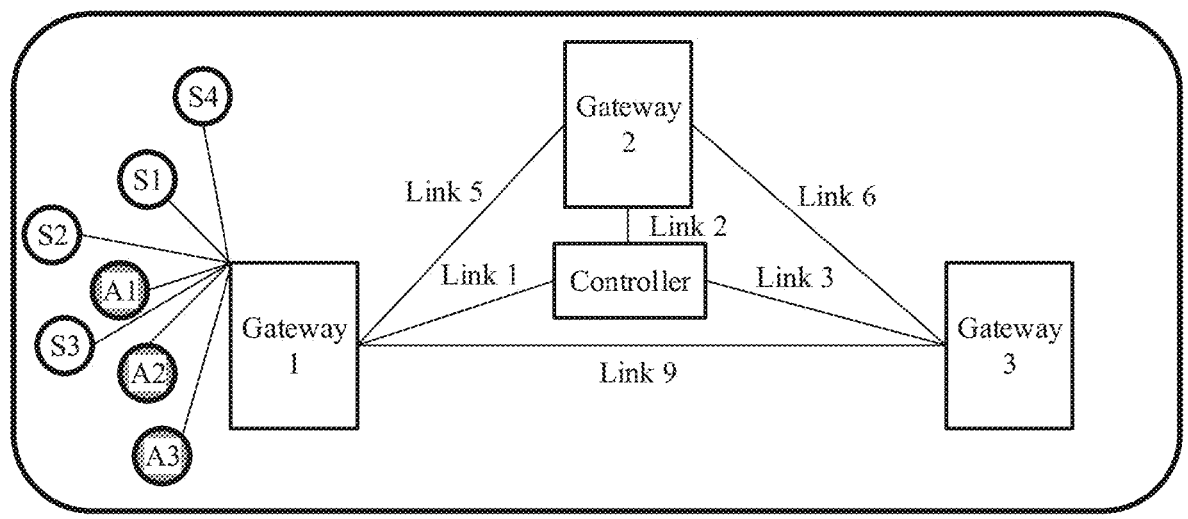
FIG. 11 is a schematic architectural diagram of another in-vehicle communications system according to an embodiment of the present disclosure.

The in-vehicle communications network shown in the foregoing embodiment is mainly explained by using an example in which four gateways are included. In actual application, the in-vehicle communications network may further include more or fewer gateways. FIG. 11 is a schematic structural diagram of another in-vehicle communications system according to an embodiment of the present disclosure. A main difference from the in-vehicle communications system shown in FIG. 3 lies in that the in-vehicle communications network shown in FIG. 11 includes three gateways (a gateway 1, a gateway 2, and a gateway 3) and at least one control device (in FIG. 11, one control device is used as an example). Similarly, each gateway device may be communicatively coupled to one or more communication endpoints, and the control device may be communicatively coupled to one or more communication endpoints. It should be noted that FIG. 11 merely shows an example of a plurality of sensors and actuators that are coupled to the gateway 1. A quantity, a type, and a deployment position of sensors/actuators that are coupled to each gateway and each controller are not limited in the present disclosure.

Similarly, each gateway is communicatively coupled to the controller, and each gateway is coupled to the controller to form a star network. In a normal case, a connection in the star network is mainly used for the data communication between the gateway and the controller. Each gateway is also coupled to two adjacent gateways to form a ring network (which may also be considered as a simplified mesh network). In a normal case, a connection in the ring network is mainly used for data communication between different gateways.

It should be noted that a related function of the in-vehicle communications network shown in FIG. 11 may be implemented with reference to related descriptions of the in-vehicle communications system shown in FIG. 3. Details are not described herein again.

It should be further noted that, based on the in-vehicle communications network shown in FIG. 11, the in-vehicle communications network may also be further improved/deformed. For example, a part of communication data is transmitted when an exception occurs. For another example, a redundant connection of a communication endpoint is added. For specific implementation, refer to the foregoing descriptions of related improvements/deformation. Details are not described herein again.

It should be further noted that the in-vehicle communications network in this embodiment of the present disclosure may further include more gateways. A specific implementation solution may be similar to that of the in-vehicle communications network shown in FIG. 3 and that of the in-vehicle communications network shown in FIG. 11. For brevity of the specification, details are not described herein.

It can be learned that the present disclosure provides an in-vehicle communications network architecture including three gateways, so that redundancy can be provided in terms of an architecture and a system design, and costs can be further reduced by reducing a quantity of gateways. In a normal case, a device (for example, the gateway or the controller) in the in-vehicle communications network may select an optimal/shortest communication link based on a network topology to implement communication, so that a communication requirement for low-latency transmission between the gateway and the controller and between the gateways can be ensured. When a communication endpoint, a gateway, an interface, or a link is abnormal, a network transmission capability can still be provided, and redundant transmission is implemented jointly through the star network and the ring network. This ensures communication function security, improves robustness, stability, and reliability of the in-vehicle communications network, and improves safety of cars, especially self-driving cars.

Figure 12:
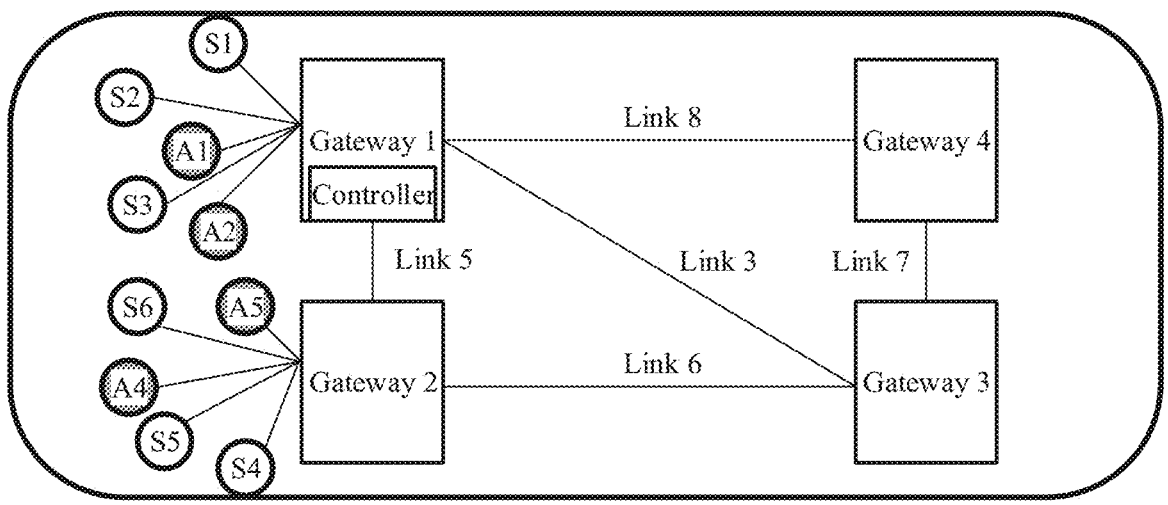
FIG. 12 is a schematic architectural diagram of another in-vehicle communications system according to an embodiment of the present disclosure.

The foregoing described embodiments are mainly described by using an example in which the controller and the gateway are independently deployed. In this embodiment of the present disclosure, the controller and one of a plurality of gateways may be further coupled as a same physical entity or may be deployed at a same physical position. In this way, the controller is communicatively coupled to the gateway through an internal line, and the controller is communicatively coupled to another gateway through an external line. FIG. 12 is a schematic structural diagram of another in-vehicle communications system according to an embodiment of the present disclosure. A main difference from the in-vehicle communications system shown in FIG. 3 lies in that a controller and a gateway 1 are coupled as a same physical entity or are deployed at a same physical position. In this case, a line 4 is integrated into a line 8, a line 2 is integrated into a line 5, and a line 1 is changed to an internal connection. In a specific embodiment, the physical entity as which the controller and the gateway 1 are coupled may externally provide a multiplexing interface. Through the multiplexing interface, the physical entity may be coupled to a gateway 4 by using the line 8, coupled to a gateway 3 by using a line 3, and coupled to a gateway 2 by using the line 5.

It may be understood that, in the embodiment in FIG. 12, each gateway is also communicatively coupled to the controller (which may be considered as a star network). In a normal case, a connection in the star network is mainly used for the data communication between the gateway and the controller. Each gateway is also coupled to two adjacent gateways (which may be considered as a ring network). In a normal case, a connection in the ring network is mainly used for data communication between different gateways.

It should be noted that an implementation solution of the in-vehicle communications system shown in the embodiment in FIG. 12 may be implemented with reference to the in-vehicle communications network shown in FIG. 3. For brevity of the specification, details are not described herein again.

It should be further noted that, based on the in-vehicle communications network shown in FIG. 11, the in-vehicle communications network may also be further improved/deformed. For example, a part of communication data is transmitted when an exception occurs. For another example, a redundant connection of a communication endpoint is added. For another example, a mesh network is formed between the gateways (for example, a connection is added between the gateway 2 and the gateway 4 and for a specific implementation solution, refer to the description of the embodiment in FIG. 9). For specific implementation, refer to the foregoing descriptions of related improvements/deformation. Details are not described herein again.

It should be further noted that the embodiment in FIG. 12 is merely used to explain the solution in this application, but is not limited thereto. A gateway coupled to the controller or deployed at a same physical position with the controller is not limited to the gateway 1, and may be another gateway. The in-vehicle communications network in this embodiment of the present disclosure may further include more or fewer gateways. For example, the in-vehicle communications network may be implemented with reference to the in-vehicle communications network shown in FIG. 11. For brevity of the specification, details are not described herein.

It can be seen that, in the present disclosure, the gateway and the controller are coupled or deployed at the same physical position. This reduces a length of some physical cables, and even some cables may be converted into internal cables of a circuit board, so as to help reduce technical difficulty and costs. The in-vehicle communications network based on this design can also provide redundancy in terms of an architecture and a system design. In a normal case, a device (for example, the gateway or the controller) in the in-vehicle communications network may select an optimal/shortest communication link based on a network topology to implement communication, so that a communication requirement for low-latency transmission between the gateway and the controller and between the gateways can be ensured. When a communication endpoint, a gateway, an interface, or a link is abnormal, a network transmission capability can still be provided, and redundant transmission is implemented jointly through the star network and the ring network. This ensures communication function security, improves robustness, stability, and reliability of the in-vehicle communications network, and improves safety of cars, especially self-driving cars.

Figure 13:
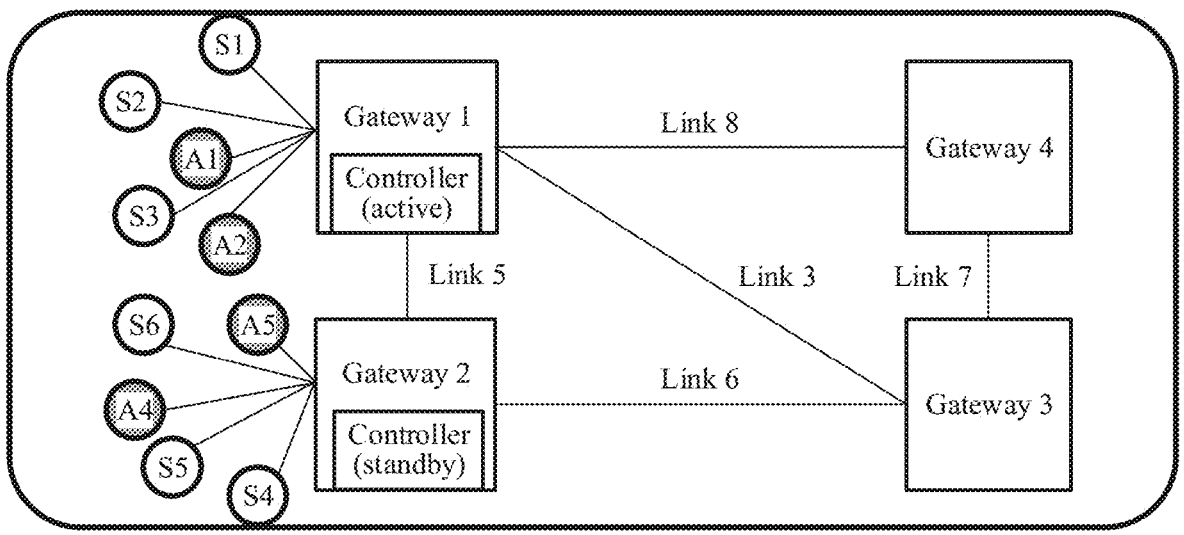
FIG. 13 is a schematic architectural diagram of another in-vehicle communications system according to an embodiment of the present disclosure.

Based on the in-vehicle communications system shown in FIG. 12, a redundancy backup of the controller may be further enhanced. FIG. 13 is a schematic structural diagram of another in-vehicle communications system according to an embodiment of the present disclosure. A main difference from the in-vehicle communications system shown in FIG. 12 lies in that there are a plurality of controllers, each controller and different gateway devices in a plurality of gateways are coupled as a same physical entity or deployed at a same physical position. Each controller is communicatively coupled to a gateway coupled to the controller through an internal line, and each controller is communicatively coupled to another gateway through an external line. As shown in FIG. 13, two controllers are mainly used as an example to explain the solution. The two controllers may be, for example, classified into a primary controller and a secondary controller. The primary controller and the gateway 1 are coupled to a same physical entity or deployed at a same physical position. The secondary controller and the gateway 2 are coupled as a same physical entity or deployed at a same physical position. The primary/secondary controller may be a backup of a same capability, or a capability of the secondary controller may be weaker than that of the primary controller, so as to further reduce costs.

It can be seen that the in-vehicle communications network based on this design can also provide redundancy in terms of an architecture and a system design. In addition to providing a network transmission capability when a communication endpoint, a gateway, an interface, or a link is abnormal, the in-vehicle communications network can also ensure that when the primary controller is abnormal (failure, fault, or capability degradation), the secondary controller replaces the primary controller to complete some or all control functions (for example, important functions such as speed reduction alarm and pulling over, or functions related to driving safety). This further ensures communication function security, improves robustness, stability and reliability of the in-vehicle communications network, and further improves safety of cars, especially self-driving cars.

The foregoing described embodiments are mainly described by using an example in which functions of the controller are centralized (for example, the controller is independently deployed, or the controller and the gateway are coupled to form a physical entity). Actually, the embodiments of the present disclosure are not limited thereto. In a possible implementation of the present disclosure, the function of the controller may be divided into N types of functional entities whose functions are relatively independent, where N≥2. In this way, the N types of functional entities are jointly used to implement the function of the control device, the function of the control device may represent a function of controlling one or more communication endpoints in the plurality of communication endpoints. The N types of functional entities are deployed on at least two gateways in the plurality of gateways in a distributed manner, at least one of the N types of functional entities is deployed on each gateway of the at least two gateways, and a sum of types of functional entities deployed on the at least two gateway devices covers the N types of functional entities. When the functional entity is in a software form (for example, a functional module), for example, this software code may be configured into a chip of the gateway. When the functional entity is in a hardware form, for example, this hardware entity may be coupled to a chip/circuit of the gateway.

Similarly, one or more gateway devices in the system may be configured to: when receiving communication data of end-to-end communication, route the communication data by using a communication link indicated by a local routing policy, if detecting that the communication link is abnormal, change the communication link to route a part or all of the communication data. The end-to-end communication includes at least one of the following: communication between at least two communication endpoints in the plurality of communication endpoints, communication between at least two gateways in the plurality of gateways, communication between any communication endpoint in the plurality of communication endpoints and any functional entity of the at least three gateways, and communication between any gateway in the plurality of gateways and any functional entity of the at least three gateways.

Figure 14:
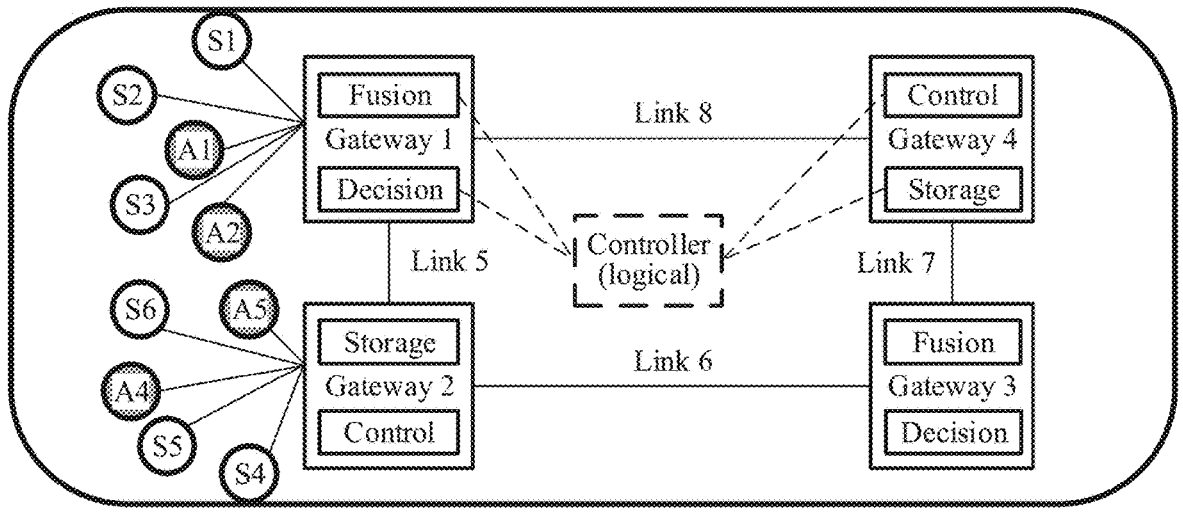
FIG. 14 is a schematic architectural diagram of another in-vehicle communications system according to an embodiment of the present disclosure.

For example, FIG. 14 is a schematic structural diagram of another in-vehicle communications system according to an embodiment of the present disclosure. An architecture including four gateways is used as an example. In an implementation, for example, the controller may be divided into four functional modules: fusion, decision, control, storage. Any two of the four entities are deployed at a same physical position separately with the gateway 1, the gateway 2, the gateway 3, and the gateway 4, or are coupled as a physical entity separately with the gateway 1, the gateway 2, the gateway 3, and the gateway 4. Specifically, for example, a fusion module and a decision module are deployed at a same physical position or coupled as a same physical entity with the gateway 1. A storage module and a control module are deployed at a same physical position or coupled as a same physical entity with the gateway 2. The fusion module and the decision module are deployed at a same physical position or coupled as a same physical entity with the gateway 3. The storage module and the control module are deployed at a same physical position or coupled as a same physical entity with the gateway 4.

In this way, the gateway 1 and the gateway 4, the gateway 2 and the gateway 3, the gateway 1 and the gateway 2, and the gateway 4 and the gateway 3 form four groups of controller redundancy. In other words, all functions of the controller can be implemented by using the gateway 1 and the gateway 4, all functions of the controller may be implemented by using the gateway 2 and the gateway 3, all functions of the controller may be implemented by using the gateway 2 and the gateway 1, or all functions of the controller may be implemented by using the gateway 4 and the gateway 3. In other words, when any one of the gateway 1, the gateway 2, the gateway 3, and the gateway 4 is abnormal, two gateways with different functions are abnormal, or a related line is abnormal, logical functions of the controller are still complete, and a vehicle can be controlled. This greatly improves security, robustness, stability, and reliability of vehicle communication.

Figure 15:
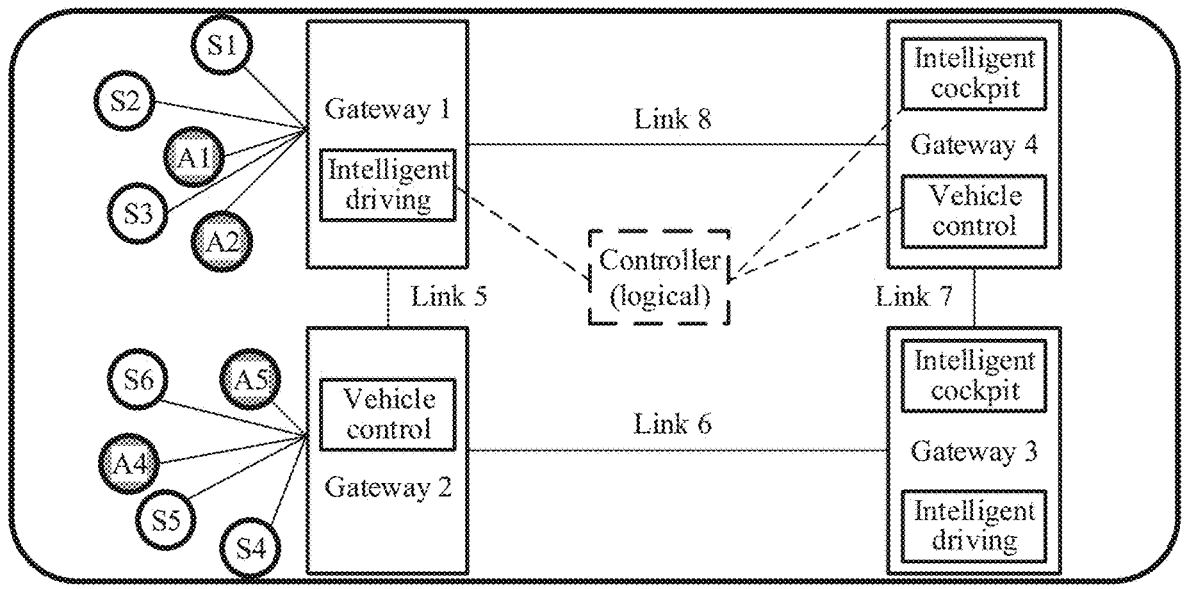
FIG. 15 is a schematic architectural diagram of another in-vehicle communications system according to an embodiment of the present disclosure.

For another example, FIG. 15 is a schematic structural diagram of another in-vehicle communications system according to an embodiment of the present disclosure. An architecture including four gateways is used as an example. In an implementation, for example, a controller may be divided into three functional modules: intelligent driving, an intelligent cockpit, and vehicle control. The intelligent driving is mainly responsible for processing data related to vehicle self-driving, such as multi-link image fusion, target identification and extraction, driving planning, and decision-making. The intelligent cockpit is mainly responsible for audio-visual entertainment in a vehicle. The vehicle control is mainly responsible for overall control of a vehicle body, for example, four-wheel balance, engine revolution speed control. One or two of the foregoing functional modules is/are deployed on each gateway, so as to ensure that each module is deployed on at least two gateways to provide functional redundancy. For example, an intelligent driving function is deployed on a gateway 1, an intelligent cockpit and a vehicle control function are deployed on a gateway 2, the intelligent driving function and the intelligent cockpit function are deployed on a gateway 3, and the vehicle control function is deployed on a gateway 4. In this way, when any gateway is faulty or a related line is abnormal, logical functions of the controller are still complete, and a vehicle can be controlled. This greatly improves security, robustness, stability, and reliability of vehicle communication.

Figure 16:
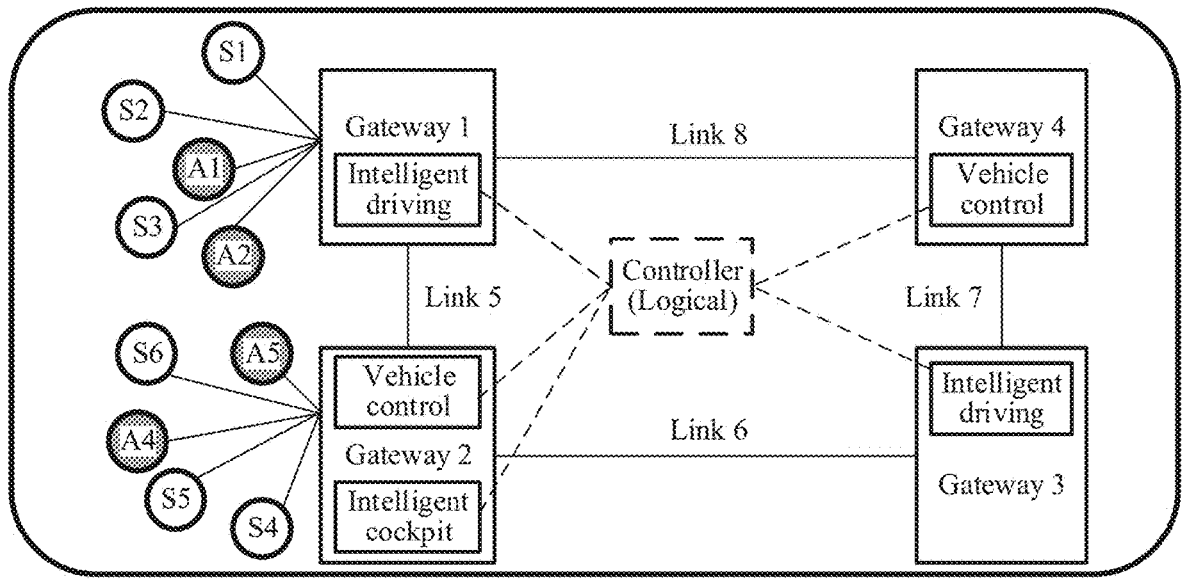
FIG. 16 is a schematic architectural diagram of another in-vehicle communications system according to an embodiment of the present disclosure.

For another example, FIG. 16 is a schematic structural diagram of another in-vehicle communications system according to an embodiment of the present disclosure. A difference from the embodiment shown in FIG. 15 lies in that, in the in-vehicle communications system shown in FIG. 16, redundancy backup is performed only for some of N functional entities obtained by dividing the controller. As shown in FIG. 16, for example, the controller may be divided into three functional modules: intelligent driving, an intelligent cockpit, and vehicle control. An intelligent driving function is deployed on the gateway 1, the intelligent cockpit and a vehicle control function are deployed on the gateway 2, the intelligent driving function is deployed on the gateway 3, and the vehicle control function is deployed on the gateway 4. In other words, the redundancy backup is performed for the intelligent driving and the vehicle control, but no redundancy backup is performed for the intelligent cockpit. In this way, when any gateway deployed with the intelligent driving is faulty or a related line is abnormal, the intelligent driving logical function of the controller is still complete. Alternatively, when any gateway deployed with the vehicle control is abnormal or a related line is abnormal, the vehicle control logical function of the controller is still complete, so that vehicle control can be implemented, and security, robustness, stability, and reliability of vehicle communication are greatly improved. In addition, the redundancy backup is not performed for less important functional modules. This helps reduce system resource overheads.

It should be noted that the embodiments in FIG. 14 to FIG. 16 are merely used to explain the solutions of this application, but are not intended to limit a quantity of functional entities obtained through dividing, a dividing criterion, a specific gateway deployed with each functional entity, and a quantity of functional entities deployed on each gateway.

It should be further noted that, based on the in-vehicle communications networks shown in FIG. 14 to FIG. 16, the in-vehicle communications networks may also be further improved/changed. For example, a part of communication data is transmitted when an exception occurs. For another example, a redundant connection of a communication endpoint is added. For specific implementation, refer to the foregoing descriptions of related improvements/changes. Details are not described herein again.

It can be learned that in the in-vehicle communications network based on this design, the gateway and some functional modules of the controller are coupled together or deployed at a same physical location. This helps reduce a difference between gateways, increases a reuse degree of the controller, and improves security, robustness, stability, and reliability of vehicle communications. The in-vehicle communications network can also provide redundancy in terms of an architecture and a system design. In addition to providing a network transmission capability when a communication endpoint, a gateway, an interface, or a link is abnormal, the in-vehicle communications network can ensure that logical functions of the controller run properly when the gateway is abnormal, so that communication function security is further ensured, and safety of cars, especially self-driving cars, is further improved.

Figure 17:
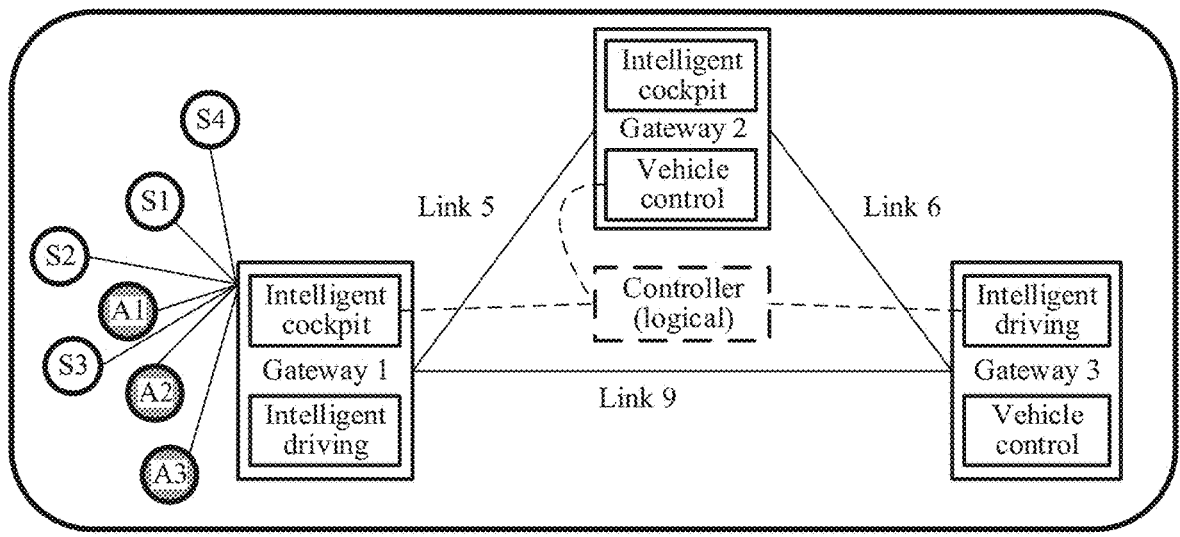
FIG. 17 is a schematic architectural diagram of another in-vehicle communications system according to an embodiment of the present disclosure.

The technical solutions of the in-vehicle communications networks shown in the foregoing embodiments in FIG. 14 to FIG. 16 are mainly explained by using an example in which four gateways are included. In actual application, the in-vehicle communications network may further include more or fewer gateways. FIG. 17 is a schematic structural diagram of another in-vehicle communications system according to an embodiment of the present disclosure. A main difference from the in-vehicle communications system shown in the embodiment in FIG. 15 lies in that the in-vehicle communications network shown in FIG. 17 includes three gateways (a gateway 1, a gateway 2, and a gateway 3). Similarly, for example, a controller may be divided into three functional modules: intelligent driving, an intelligent cockpit, and vehicle control. One or two of the foregoing functional modules is/are deployed on each gateway, to ensure that each module is deployed on at least two gateways, to provide functional redundancy. For example, an intelligent driving function and an intelligent cockpit function are deployed on the gateway 1, the intelligent cockpit function and a vehicle control function are deployed on the gateway 2, and the intelligent driving function and the vehicle control function are deployed on the gateway 3.

It should be noted that a related function of the in-vehicle communications network shown in FIG. 17 may be implemented with reference to related descriptions of the in-vehicle communications systems shown in FIG. 14 to FIG. 16. Details are not described herein again. Based on the in-vehicle communications network shown in FIG. 17, the in-vehicle communications network may also be further improved/changed. For example, a part of communication data is transmitted when an exception occurs. For another example, a redundant connection of a communication endpoint is added. For specific implementation, refer to the foregoing descriptions of related improvements/changes. Details are not described herein again.

It should be further noted that the in-vehicle communications network in this embodiment of the present disclosure may further include more gateways. For brevity of the specification, details are not described in this specification.

It can be learned that the present disclosure provides an in-vehicle communications network architecture including three gateways, so that redundancy can be provided in terms of an architecture and a system design, and costs can be further reduced by reducing a quantity of gateways. The gateway and some functional modules of the controller are coupled together or deployed at a same physical location. This helps reduce a difference between gateways, increases a reuse degree of the controller, and improves security, robustness, stability, and reliability of vehicle communications.

Figure 18:
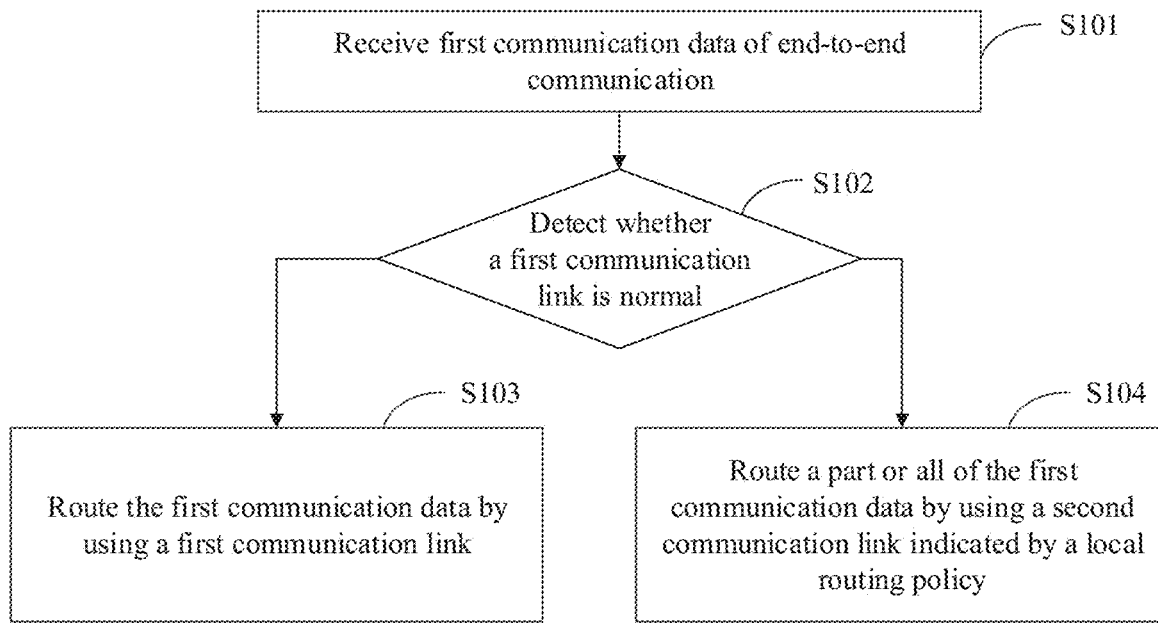
FIG. 18 is a schematic flowchart of an in-vehicle communication method according to an embodiment of the present disclosure.

Based on the foregoing description, the following further describes an in-vehicle communication method according to an embodiment of the present disclosure. FIG. 18 is a schematic flowchart of an in-vehicle communication method according to an embodiment of the present disclosure. The method is performed by a first device, the first device may be one or more gateways in an in-vehicle communications network, or may be a controller. The in-vehicle communications network may be the in-vehicle communications network described in any one of the foregoing embodiments, and the method includes but is not limited to the following steps:

Step S101: The first device receives first communication data of end-to-end communication.

In some embodiments, when the in-vehicle communications network is the in-vehicle communications network described in any one of the foregoing embodiments in FIG. 3 to FIG. 13 (in other words, functions of a controller are integrated together), the first device is any gateway device in the plurality of gateway devices or any control device in the at least one control device. The end-to-end communication includes at least one of the following: communication between at least two communication endpoints in the plurality of communication endpoints, communication between at least two gateway devices in the plurality of gateway devices, communication between any communication endpoint in the plurality of communication endpoints and the control device, or communication between any gateway device in the plurality of gateway devices and the control device.

In some other embodiments, when the in-vehicle communications network is the in-vehicle communications network described in any one of the foregoing embodiments in FIG. 14 to FIG. 17 (in other words, functions of the controller are distributed to different gateways), the end-to-end communication includes at least one of the following: communication between at least two communication endpoints in the plurality of communication endpoints, communication between at least two gateway devices in the plurality of gateway devices, communication between any communication endpoint in the plurality of communication endpoints and any functional entity in the at least three gateway devices, or communication between any gateway device in the plurality of gateway devices and any functional entity in the at least three gateway devices.

Step S102: The first device detects whether a first communication link indicated by a local routing policy is abnormal.

The local routing policy is determined by a network topology of the in-vehicle communications networks provided in the embodiments of the present disclosure. The local routing policy may include transmission policies of a plurality of communication links, for example, may be a routing forwarding table (or referred to as a routing table). For different pieces of communication data, a plurality of communication links corresponding to each type of communication data are determined, and are sorted based on priorities, for example, the first communication link, a second communication link, and a third communication link. Each communication link can successfully route communication data.

The network topology is a key factor that determines the routing table. The gateway 1 in the in-vehicle communications system shown in FIG. 3 is used as an example. If data needs to be transmitted to the gateway 4, there may be at least the following three communication links: (1) the gateway 1-the gateway 4, in other words, the communication data is transmitted by using a directly coupled link between the gateway 1 and the gateway 4; (2) the gateway 1-the controller-the gateway 4, in other words, the communication data is forwarded by using the controller; and (3) the gateway 1-the gateway 2-the gateway 3-the gateway 4, in other words, the communication data is relayed by using the gateway 2 and the gateway 3.

When a number of hops and a latency of a link are considered, "the gateway 1-the gateway 4" may be set as an optimal communication link. Therefore, a routing table with routes to the gateway 4 may be formed at the gateway 1, where the communication link (1) is a first choice, the communication link (2) is a second choice, and the communication link (3) is a third choice. Certainly, other factors such as load and remaining bandwidth of each link may also be considered to determine a priority of a link in the routing table. In addition to the network topology, a service priority and a target gateway also affect selection of the link in the routing table. For example, for some non-emergency services that do not need to be processed by the controller, when the communication link (1) is faulty, the communication link (3) may be a better choice for transmission. Although the communication link (2) has a shorter latency, the communication link (2) occupies bandwidth of an emergency service transmitted to the controller, and increases load of the controller. Consequently, overload may be caused, and some advanced functions, such as self-driving, may be affected.

In specific implementation, the local routing policy may be obtained by the first device by performing accumulation storage based on historical routing experience, or may be pre-configured in the first device. In other words, the routing table, the communication link priority, and the like of the communication data between the gateway and the controller may be automatically generated by the device according to a standard protocol, or may be obtained through pre-configuration.

For the same routing link, service transmission may also be adjusted according to a local routing policy. For example, the communication data transmitted by the gateway 1 to the controller includes raw image data raw data and object data object from a camera. When the gateway 1 detects that the link between the gateway 1 and the controller is congested or is partially faulty, the gateway 1 can directly transmit the object to the controller according to the local routing policy, and forward the raw data to the controller by using the gateway 2 or the gateway 4, or directly discard the raw data.

To increase the redundancy of data transmission, the local routing policy can be configured as multi-link concurrency. For example, the gateway 1 sends two copies of the same object to the controller, one copy is transmitted by using the directly coupled link, and the other copy is forwarded by using the gateway 2. In this way, the controller can receive the object as long as no two copies of the object fail to be received. For the raw data, only one copy is configured, for example, the raw data is sent by using the link directly coupled to the controller. Certainly, when one copy is sent, data splitting may also be performed by using a multi-hop path. For example, the raw data is divided into two parts, one part is sent by using the link directly coupled to the controller, and the other part is forwarded by using the gateway 4.

The local routing policy may be pre-configured on the gateway and the controller. In addition to the foregoing static configuration, the local routing policy can also be configured to be dynamic. For example, a specific local routing policy can be triggered when a specific condition is met. For example, in the gateway 1, a condition for performing traffic distribution transmission on the raw data is set as follows: When the directly coupled link between the gateway 1 and the controller occupies 75% of bandwidth, a part of raw data is forwarded by using the gateway 4.

In different application scenarios, electronic components such as a chip of the controller, a cable, an interface, and a connector may fail randomly, or various electronic components may be loose, disconnected, or damaged during bumping, or some electronic components may be faulty or damaged after a car collision. These possibilities may cause interruption of in-vehicle network communication or damage to some vehicle functions. When an exception occurs, the first device may detect the exception of the first communication link according to a detection method, for example, for a physical layer, a MAC layer, or a component failure.

The first communication link is determined by the first device based on the network topology of the in-vehicle communications network and a route target of the communication data. The first communication link may be a communication link with a shortest/optimal distance or a shortest latency in the in-vehicle communications network. The first device may determine the route target by parsing address information of the communication data. The route target may be, for example, the controller, one or more other gateways, or one or more communication endpoints.

Step S103: When detecting that the first communication link is normal, the first device routes the first communication data by using the first communication link indicated by the local routing policy.

Step S104: When detecting that the first communication link is abnormal, the first device routes a part or all of the first communication data by using the second communication link indicated by the local routing policy.

The second communication link is determined by the first device based on the network topology of the in-vehicle communications network and the route target of the communication data. The second communication link is different from the first communication link. In this embodiment of the present disclosure, based on the communication line redundancy (such as the redundant connection generated by combining the ring network and the star network, and the redundant connection generated by combining the mesh network and the star network) described in the foregoing in-vehicle communications networks, communication endpoint redundancy, and controller redundancy, the first device may determine the second communication link with the shortest/optimal distance or the shortest latency in addition to the first communication link. Further, the part (for example, information with high importance, and/or high priority, and/or a small amount of data) or all of the first communication data is routed by using the second communication link. For a specific implementation process, refer to descriptions in the foregoing related embodiments. For brevity of the specification, details are not described herein again.

It can be learned that, when the method is implemented, in a normal case, the device (for example, the gateway or the controller) in the in-vehicle communications network may select the optimal/shortest communication link based on the network topology to implement communication, so that a communication requirement for low-latency transmission between the gateway and the controller and between the gateways can be ensured. When a controller, a gateway, an interface, or a link is abnormal, communication interaction can still be implemented by using different communication links. This maintains a network transmission capability, ensures communication function security, improves robustness, stability and reliability of the in-vehicle communications network, and improves safety of cars, especially self-driving cars.

The methods in the embodiments of the present disclosure are described above in detail, and apparatuses in the embodiments of the present disclosure are provided below.

Figure 19:
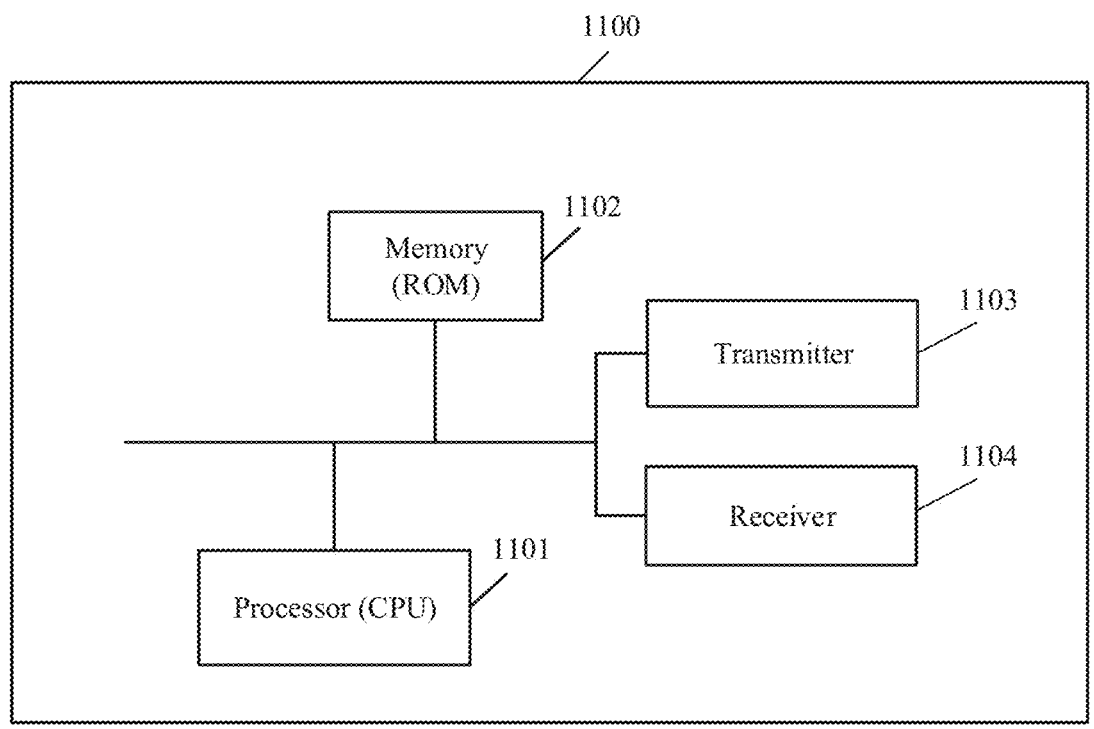
FIG. 19 is a schematic structural diagram of a device according to an embodiment of the present disclosure.

Referring to FIG. 19, an embodiment of the present disclosure provides a device 1100. The device includes a processor 1101, a memory 1102, a transmitter 1103, and a receiver 1104. The processor 1101, the memory 1102, the transmitter 1103, and the receiver 1104 are coupled to each other (for example, coupled to each other by using a bus, or some or all of the processor 1101, the memory 1102, the transmitter 1103, and the receiver 1104 may be coupled together).

The memory 1102 includes but is not limited to a random access memory (Random Access Memory, RAM), a read-only memory (Read-Only Memory, ROM), an erasable programmable read-only memory (Erasable Programmable Read Only Memory, EPROM), or a compact disc read-only memory (Compact Disc Read-Only Memory, CD-ROM). The memory 1102 is configured to store a related instruction and related data (for example, communication data).

The transmitter 1103 is configured to transmit data, and the receiver 1104 is configured to receive data.

The processor 1101 may be one or more central processing units (Central Processing Unit, CPU). When the processor 1101 is one CPU, the CPU may be a single-core CPU or a multi-core CPU.

The processor 1101 is configured to read program code stored in the memory 1102, to implement a function of the first device in the embodiment in FIG. 17. The first device may be, for example, a gateway or a controller.

Specifically, when the device 1100 is the gateway, the program code stored in the memory 1102 is specifically used to implement a function of any gateway in the in-vehicle communications network in any embodiment in FIG. 3 to FIG. 17, and the any gateway may be an independent gateway, or may be a gateway that integrates some functions of the controller (for example, the functions of the controller in the embodiments in FIG. 14 to FIG. 17) or all functions of the controller (for example, the functions of the controller in the embodiments in FIG. 12 and FIG. 13).

Specifically, when the device 1100 is the controller, the program code stored in the memory 1102 is specifically used to implement a function of the controller in the in-vehicle communications network in any one of the embodiments in FIG. 3 to FIG. 11.

It should be noted that FIG. 19 is merely an implementation of this embodiment of the present disclosure. In an actual application, the terminal 1100 may further include more or fewer components. This is not limited herein.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, all or of the procedures or functions are generated according to the embodiments of the present disclosure. The computer may be a general-purpose computer, a computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, microwave, or the like) manner. The computer-readable storage medium may be any usable medium accessible by a computer, or a data storage device, a server or a data center, integrating one or more usable media. The usable medium may be a magnetic medium (for example, a floppy disk, a hard disk, a magnetic tape), an optical medium (for example, a DVD), a semiconductor medium (for example, a solid-state drive), or the like.

In the foregoing embodiments, the descriptions in each embodiment have respective focuses. For a part that is not described in detail in an embodiment, refer to related descriptions in other embodiments.

What is claimed is:

1. An in-vehicle communications system, comprising:
at least one control device;
a plurality of gateway devices; and
a plurality of communication endpoints, wherein each gateway device is communicatively coupled to the control device and at least two other gateway devices of the plurality of gateway devices, and each gateway device is further communicatively coupled to at least one communication endpoint, wherein the at least one control device is configured to transmit first communication data, and the plurality of gateway devices include a first gateway device, and wherein the at least one control device has one or more functions of intelligent driving, an intelligent cockpit, or vehicle control by controlling each of the communication endpoints by receiving and processing data from the communication endpoint;

wherein the first gateway device is configured to: when receiving the first communication data, transmit the first communication data by using a first communication link indicated by a routing policy, and when the first communication link is abnormal, transmit a part or all of the first communication data by using a second communication link indicated by the routing policy, and wherein the first communication data includes at least one of the following: communication data between at least two communication endpoints of a plurality of communication endpoints coupled to the plurality of gateway devices, communication data between at least two gateway devices of the plurality of gateway devices, communication data between any communication endpoint of the plurality of communication endpoints and the control device, or communication data between any gateway device of the plurality of gateway devices and the control device.

2. The system according to claim 1, wherein at least one of the communication endpoints comprises at least one of a sensor or an electric control unit of an actuator.

3. The system according to claim 1, wherein each gateway device of the plurality of gateway devices is coupled in series to an adjacent gateway device to form a ring communications network.

4. The system according to claim 1, wherein each gateway device of the plurality of gateway devices is communicatively coupled to all other gateway devices to form a mesh communications network.

5. The system according to claim 1, wherein that the first communication link is abnormal specifically comprises at least one of the following:
the first communication link fails,
the first communication link is congested, or
some functions of the first communication link fail.

6. The system according to claim 1, wherein at least two communication endpoints of a plurality of communication endpoints coupled to the plurality of gateway devices having a same function or overlapped functions, wherein
the at least two communication endpoints are separately communicatively coupled to different gateway devices, or at least one communication endpoint of the at least two communication endpoints is communicatively coupled to at least one gateway device in the plurality of gateway devices, and another communication endpoint of the at least two communication endpoints is communicatively coupled to at least one control device.

7. The system according to claim 6, wherein the at least two communication endpoints are located at a same area of a vehicle.

8. The system according to claim 1, wherein at least one communication endpoint of a plurality of communication endpoints coupled to the plurality of gateway devices is communicatively coupled to at least two gateway devices in the plurality of gateway devices separately, or at least one communication endpoint of the plurality of communication endpoints is communicatively coupled to at least one gateway device in the plurality of gateway devices, and is also communicatively coupled to at least one control device.

9. The system according to claim 1, wherein the first gateway device is further configured to:
when receiving second communication data, route a part or all of the second communication data by using a third communication link indicated by the routing policy, and route a part or all of the second communication data by using a fourth communication link indicated by the routing policy.

10. The system according to claim 1, wherein the control device and one gateway device of the plurality of gateway devices are coupled as a same physical entity or deployed at a same physical position.

11. The system according to claim 1, further comprising:
a plurality of control devices, wherein each control device and a different gateway device of the plurality of gateway devices are coupled as a same physical entity or deployed at a same physical position.

12. The system according to claim 1, wherein all of the plurality of gateway devices are deployed in the vehicle, or some of the plurality of gateway devices are deployed in the vehicle.

13. The system according to claim 1, wherein N types of functional entities are deployed on at least two gateway devices in the plurality of gateway devices in a distributed manner, at least one of the N types of functional entities is deployed on each gateway device in the at least two gateway devices, a sum of types of functional entities deployed on the at least two gateway devices covers the N types of functional entities, and wherein N≥2.

14. The system according to claim 1, wherein the first gateway device is configured to detect whether the first communication path is abnormal.

15. The system according to claim 1, wherein the routing policy is preconfigured in the first gateway device.

16. The system according to claim 1, wherein the plurality of communication endpoints comprise at least one sensor, and the at least one control device is configured to receive data from the at least one sensor, and perform driving planning or vehicle control according to the data.

17. The system according to claim 1, wherein the at least one control device comprises primary control device and secondary control device, the primary control device and the secondary control device have same capability or the secondary control device has less capability than the primary control device.

18. The system according to claim 1, wherein the plurality of gateways are all gateways deployed in the vehicle, or are some of all gateways deployed in the vehicle.

19. The system according to claim 1, wherein at least one of the communication endpoints comprises a sensor and an electric control unit having functions of computing and controlling, wherein the at least one control device is configured to adjust parameters of the sensor.

20. The system according to claim 1, wherein the first communication link is abnormal comprises traffic capability of a line port of the link decreases or a switching capability of a gateway in the link decreases.

* * * * *